United States Patent

[11] 3,549,810

[72] Inventors John J. Driscoll
Naperville, Ill.;
Donald G. Hill; Richard E. Waddell,
Indianapolis, Ind.

[21] Appl. No. 723,067
[22] Filed Apr. 22, 1968
[45] Patented Dec. 22, 1970
[73] Assignee Bell Telephone Laboratories, Incorporated
Murray Hill, Berkeley Heights, N.J.
a corporation of New York

[54] TELEPHONE REPORTING SET
15 Claims, 13 Drawing Figs.

[52] U.S. Cl. .......... 179/5, 179/90
[51] Int. Cl. .......... H04m 11/04, H04m 1/45
[50] Field of Search .......... 179/5, 5P

[56] References Cited

UNITED STATES PATENTS

| | | | |
|---|---|---|---|
| 3,133,157 | 5/1964 | Platt et al. .......... | 179/18 |
| 3,360,607 | 12/1967 | Oppenheimer .......... | 179/5 |
| 3,407,269 | 10/1968 | Brzoska .......... | 179/5 |
| 3,427,403 | 2/1969 | Stokes et al. .......... | 179/5 |

*Primary Examiner*—Kathleen H. Claffy
*Assistant Examiner*—Douglas W. Olms
*Attorneys*—R. J. Guenther and Edwin B. Cave

ABSTRACT: The telephone set monitors four separate conditions and reports the occurrence of any one of these conditions, by sequentially calling as many as three different stations from a repertory of six stations and transmitting a prerecorded message identifying its location and the occurrence of the particular condition. In addition, the reporting set indicates whether the condition continues to exist and provides the called station with the opportunity to initiate corrective action with respect to the condition. The user of the reporting set is able to control the number of calls made to the station associated with each condition and the priority that one condition has over another. Furthermore, the reporting set may itself be called to check its operation or to check whether any of the conditions exist at the time of the call.

INVENTORS: J.J. DRISCOLL
D.G. HILL
R.E. WADDELL
BY
Harry L. Newman
ATTORNEY

TELEPHONE REPORTING SET

FIELD OF INVENTION

This invention relates to the field of telephone communication and within that field to the area of alarm reporting over telephone circuits.

Telephone reporting sets have been developed for surveillance of unattended subscriber locations. These reporting sets are used to perform surveillance of the unattended premises themselves, such as for fire or burglary, or to perform surveillance of equipment located at the unattended premises, such as for ineffective operation or failure of the equipment. The surveillance is carried out by monitoring the premises or equipment for the occurrence of particular preselected conditions, hereinafter referred to as alarm conditions. When such a condition occurs, the reporting set responds by calling a preselected station and informing the called station of the source of the call and the occurrence of the condition.

DESCRIPTION OF THE PRIOR ART

Hereinbefore, the capabilities of telephone reporting sets have been quite limited. Most reporting sets respond to the occurrence of only a single alarm condition or, where responding to more than one condition, are unable to identify which particular condition has in fact occurred. In addition, most reporting sets respond to the occurrence of an alarm condition by calling a single preselected station.

Among those reporting sets that are able to monitor more than one alarm condition and identify each condition individually, none have the capability of giving priority to one condition over another where more than one condition occurs simultaneously or in close succession of one another. Such a capability is desirable because the reporting of a fire is certainly of greater urgency than and should take priority over the reporting of a breakdown of equipment.

Furthermore, among those reporting sets that respond to the occurrence of an alarm condition by calling more than one preselected station, very few have the capability of sequentially calling a plurality of stations until a response is received from one of the called stations. This capability is desirable because it increases the probability that the alarm condition will be quickly reported to an interested party. Thus the possibility of two or three stations being busy or unattended is much less than the possibility of a single station being busy or unattended.

SUMMARY OF THE INVENTION

The reporting set of the present invention monitors an unattended facility for the occurrence of as many as four different conditions and responds to the occurrence of any one of these conditions by sequentially calling as many as three different stations from a repertory of six stations, the stations called and the sequence in which they are called having been programmed for each condition.

After calling a station, the reporting telephone transmits a prerecorded message identifying its location and the occurrence of the particular condition. If the condition continues to exist, an intermittent alarm signal is transmitted with the message. Furthermore, a continuous interrogate signal is briefly transmitted during the course of the message, and if the called station returns a control signal during the transmission of the interrogate signal, a relay associated with the condition being reported is energized. This relay may be used by the subscriber to either initiate corrective action with respect to the condition or initiate some other activity at the unattended facility. Transmission of the control signal by a called station at any other time causes the reporting telephone to terminate its calling operation and reset to a standby condition.

If no resetting control signal is received by the reporting telephone, it transmits the prerecorded message four times, drops the telephone line, and then calls the next station that it is programmed to call. The reporting telephone can be programmed to call each of the three stations once and then reset to a standby condition, or it can be programmed to continue to sequentially call these stations until a resetting control signal is received.

If more than one of the conditions occurs at the same time, the reporting of the conditions will be done in a particular order as selected by the subscriber. The reporting telephone may be programmed to report the condition of highest priority until a resetting control signal is received from a called station or it may be programmed to only continue to report the condition of highest priority until all three stations associated with this condition have been called.

Furthermore, should a condition occur while a condition of lower priority is being reported, the reporting telephone will complete the call in progress. Then the reporting telephone will, depending upon how it is programmed, either continue to report the condition of lower priority until all three stations associated with this condition have been called, or it will immediately commence to report the condition of higher priority.

The reporting telephone may itself be called and it answers the call by briefly transmitting the interrogate signal. If the calling station returns the control signal while the interrogate signal is being transmitted, the reporting telephone responds by sequentially transmitting the prerecorded message for each condition. Otherwise the reporting telephone drops the telephone line.

The alarm signal is transmitted with each message if the condition reported by the message exists at the time the message is transmitted. In addition, the interrogate signal is briefly transmitted during the course of each message, and if the calling station again returns the control signal coincident therewith, the subscriber use relay associated with the condition being reported is energized.

If the calling station transmits the control signal at any other time, the reporting telephone drops the telephone line and resets to a standby condition. If, on the other hand, the calling station does not transmit the resetting control signal, the reporting telephone will drop the telephone line after it has completed transmitting the messages, and then it will make one attempt to call a particular one of the stations in its repertory. During this callback the reporting telephone only transmits a continuous identification signal, and at the end of the call, the reporting telephone resets itself to the standby condition.

DESCRIPTION OF THE DRAWING

FIGS. 4 through 10 are to be oriented with respect to one another.

DETAILED DESCRIPTION

Figure 1A:
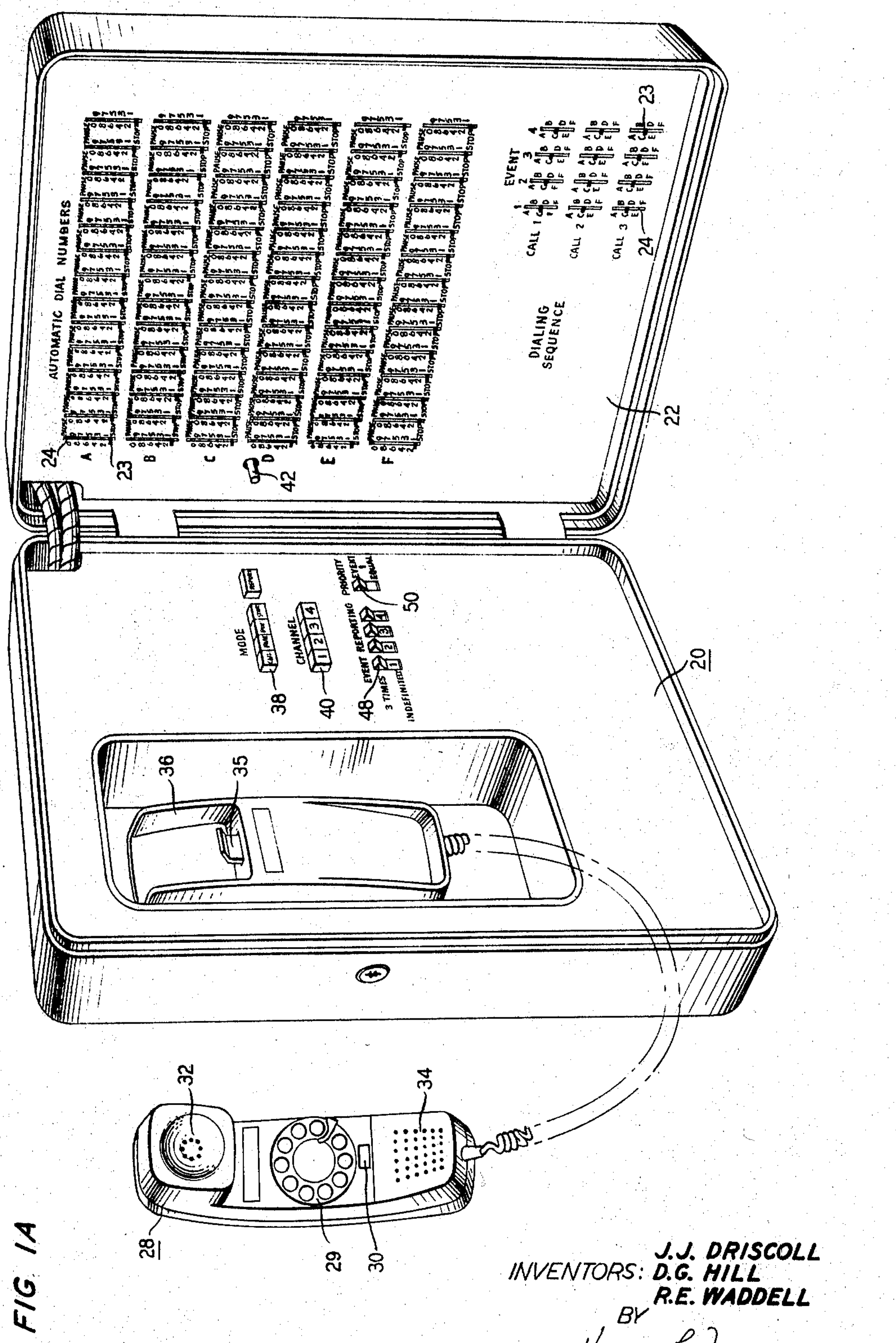
FIG. 1A is a perspective view of the controls operated by the subscriber in programming the telephone reporting set of the present invention.

Referring to FIG. 1A of the drawing, the telephone reporting set is contained within a housing 20 having a door 22 which when opened exposes the controls operated by the subscriber in programming the reporting set. On the door 22 itself there are two arrays of manual slide switches such as disclosed in U.S. Pat. No. 3,308,250 issued to N. L. Field III and J. F. Ritchey on Mar. 7, 1967. Each switch includes a selector 23 that is slidably displaceable along the length of a slot 24. Each switch also includes a detent (not shown) that limits the location of the selector 23 along the length of the slot 24 to a particular number of discrete positions. In each position, the selector 23 generally closes a pair of contacts that are unique to that position.

Figure 5:
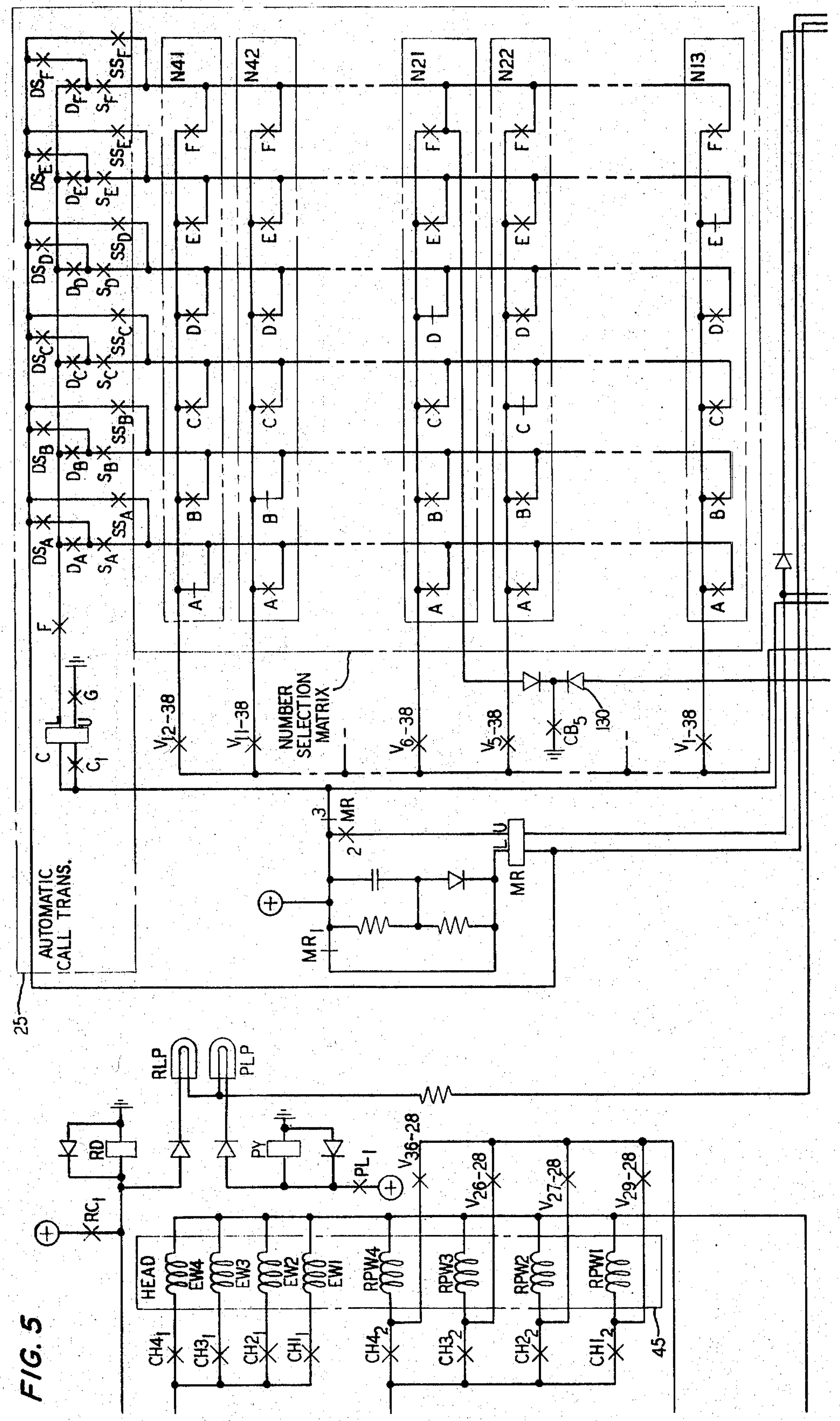

The first array of slide switches, labeled "Automatic Dial Numbers," is used to select six telephone numbers to be called by an automatic call transmitter 25 shown schematically in FIG. 5. These slide switches, some of which are shown in FIG. 1A, are arranged in six rows lettered A through F. Each row corresponds to an individual telephone number, and there are 14 switches in each row, each switch corresponding to an individual digit in a telephone number. The leftmost slide switch in each row is the first digit switch and the rightmost slide switch is the 14th digit switch.

The selector 23 of each digit switch is locatable in one of 12 positions. The topmost position is labeled "PAUSE," and it is used to provide a lapse of time between digits such as when there must be a pause for a second dial tone. Only in this position does the selector 23 not close a pair of contacts. The next 10 positions are labeled 0 through 1 and are used to select a particular numerical value for an individual digit. The pairs of contacts associated with these 10 positions are referred to as the value contacts. The bottom-most position is labeled "-STOP," and it is used following the last digit of a number that has less than 14 digits to indicate the end of the telephone number. The pair of contacts associated with this position are referred to as the stop switch.

The call transmitter 25, which is similar to the call transmitter disclosed in the copending application of J. J. Driscoll, Ser. No. 539,468, filed Apr. 1, 1966, now U.S. Pat. No. 3,509,286 and assigned to the assignee of the present invention, includes a switching matrix consisting of three pluralities of switches that are interconnected with one another.

The first plurality of switches comprises the six groups of digit switches of the Telephone Number array. The second plurality of switches comprises 10 normally open switches that are continuously closed and opened in sequence, there being one complete sequential actuation for each of the possible 14 digits in a selected telephone number and there being a time lapse between each complete sequential actuation. Each of these switches, referred to as the fast sequence switches, is connected to an individual corresponding pair of value contacts on each of the digit switches. Thus the first of the fast sequence switches is connected to the 0 pair of contacts of every digit switch in the Telephone Number array, the second fast sequence switch is connected to the 9 pair of contacts of every digit switch in the Telephone Number array, and so on.

The third plurality of switches comprises six groups of 14 switches each. The switches in each group are normally open and are closed and opened in sequence, one switch in each group being simultaneously closed during each complete actuation of the fast sequence switches. Each of these switches, referred to as the slow sequence switches, is connected to all the pairs of value contacts of an individual digit switch, the first slow sequence switch in each group being connected to the pairs of value contacts of an individual first digit switch, the second slow sequence switch in each group being connected to the pairs of value contacts of an individual second digit switch, and so on.

With this arrangement, if the first digit switch for the A telephone number is in the 0, a path is provided through the switching matrix during the first sequential actuation of the fast switches when the first fast sequential switch is closed. Of course, if the first digit switch for the B telephone number is in the 9 position, a path is also provided through the switching matrix during the first sequential actuation of the fast switches when the second fast switch is closed. Thus for each sequential actuation of the fast switches, there may be, depending on the positions of the digit switches, six different paths through the switching matrix. However, as hereinafter shown, only one path through the switching matrix is of consequence during the transmission of each digit of a particular telephone number.

In the schematic of FIG. 5, the fast sequence switches are shown as a single normally open switch F, the digit switches of each telephone number are shown as a single normally open switch D having the subscript A through F associated therewith, and each group of slow sequence switches is shown as a single normally open switch S having the same subscript as the group of digit switches to which it is connected. The fast sequence switches F are connected to one end of the latch winding of a calling relay C, the other end of the latch winding being connected through normally closed contacts $MR_3$ to a voltage source. Thus when a path is provided through the switching matrix and that path is grounded, the latch winding of the calling relay C is energized.

The calling relay C, when latched, closes a pair of normally open contacts $C_1$ in the path connecting one end of the unlatch winding to the voltage source. In addition, it opens a pair of normally closed contacts $C_2$ (FIG. 4) that are connected in parallel with a normally closed pulsing switch P. The pulsing switch P opens and closes 10 times a second and when the contacts $C_2$ are open, the pulsing switch acts to interrupt the telephone line and transmit pulses thereover. Consequently, when a grounded path is provided through the switching matrix, it initiates the transmission of pulses out on the telephone line.

The pulsing switch P and the fast sequence switches F close and open at the same frequency and they are synchronized so that the pulsing switch is closed at the same time that a fast switch is closed. In addition, immediately following each complete sequential actuation of the fast switches F, a normally open switch G closes and connects the unlatch winding of the calling relay C to ground, whereby the winding is energized through the closed contacts $C_1$ and the normally closed contacts $MR_3$. The contacts $C_1$ thereupon reopen to deenergize the unlatch winding, and the contacts $C_2$ reclose to place a short across the pulsing switch P. Thus a group of pulses is transmitted commencing with the closure of the fast sequence switch F that completes a grounded path through the switching matrix and ending with the completion of the sequential actuation of the fast switches. The number of pulses transmitted is, of course, proportional to the length of time that transpires between these two occurrences. The time lapse between each complete sequential actuation of the fast switches F provides the interdigital period between transmission of digits.

As seen from FIG. 5, the call transmitter 25 also includes two other normally open switches associated with each telephone number. A first of these switches, indicated as DS, is the stop switch that is closed by the positioning of a digit switch in the STOP position, the first digit switch following the last digit of a telephone number having less than 14 digits being placed in this position. The stop switch DS for each digit of a telephone number is connected in series with the associated slow sequence switch S.

The other switch associated with each telephone number is a slow sequence stop switch SS that is briefly closed following each complete sequential actuation of the slow sequence switches S. The stop switch SS serves a function when the telephone number has 14 digits, and therefore there is no digit switch in the STOP position and the stop switch DS does not close. Each stop switch SS is connected in parallel with the associated slow sequence switch S and stop switch DS. Either of these paths when closed, serve to connect the latch winding of a motor relay MR to ground.

The fast sequence switches F, the slow sequence switches S, the stop switches SS, and the pulsing switch P are all operated by a motor 26 (FIG. 10), and the operation advantageously takes place through the rotation of groups of contacts over a printed circuit disc. This arrangement is shown in the aforementioned Driscoll application. The motor 26 also operates a pair of normally open contacts $N_1$ and a pair of normally closed contacts $N_2$ (FIG. 9), the contacts $N_1$ closing shortly after the calling cycle begins followed by the opening of the contacts $N_2$. Both pairs of contacts return to normal as the calling cycle ends.

Figure 1B:
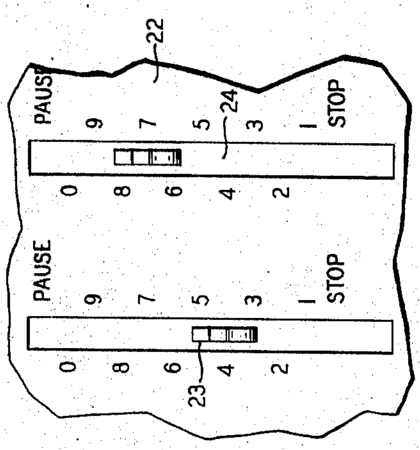
FIGS. 1B and 1C are enlarged front views of portions of the digit and number selecting controls, respectively.

Turning again to FIG. 1, the second array of slide switches on the door 22 consists of three rows with four switches in each row. These slide switches, some of which are shown in FIG. 1B, are referred to as number switches. They serve to select which of the six preselected telephone numbers are to be called in response to each of four conditions the reporting set monitors. The occurrence of each of these conditions is called an "event" and it is seen that three telephone numbers can be called for each event. The number switches also serve to select the order in which the telephone numbers are to be called. Each of the selectors 23 of the number switches is locatable in one of six positions labeled A through F, the letters corresponding to the six telephone numbers stored in the Telephone Number array.

The number switches are shown schematically in FIG. 5 as individual switches $N_{a-b}$ where $a$ corresponds to the event number 1, 2, 3, or 4 and $b$ corresponds to the call number 1, 2 or 3. Each number switch has six pairs of contacts each of which corresponds to an individual telephone number A through F and each of which is connected in series with the slow sequence switch S and slow sequence stop switch SS associated with that telephone number. One of the six pairs of contacts for each number switch is, of course, closed while all the rest are open.

Figure 1C:
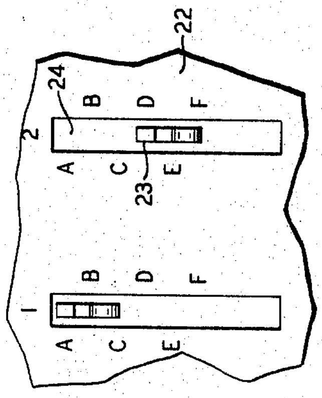
Figure 9:
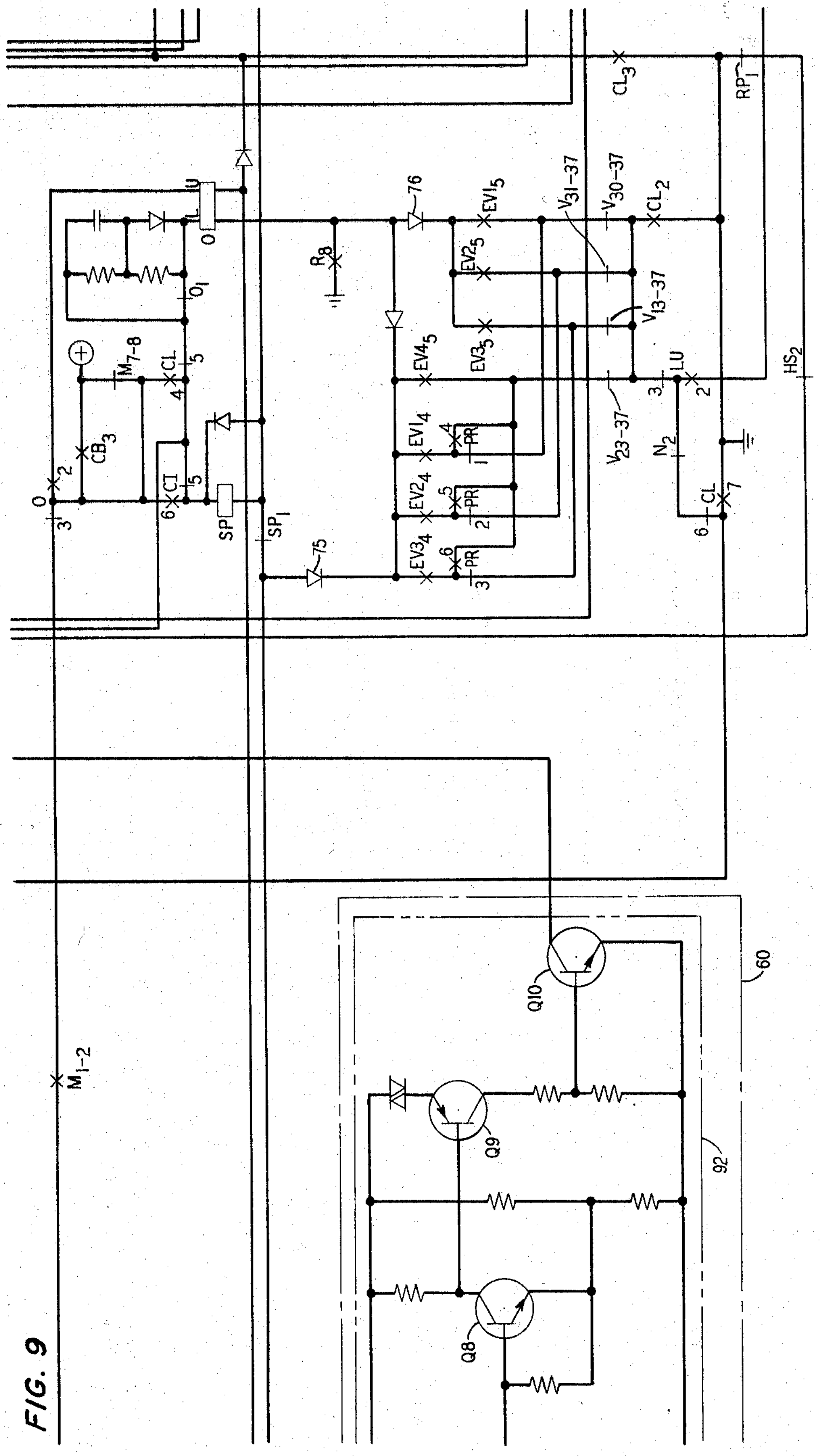
Figure 11:
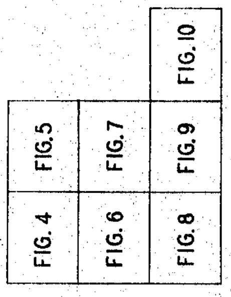
FIG. 11 shows how

As shown in FIG. 1, the portion of the housing 20 facing the door 22 incorporates other controls for programming the reporting set. These controls include a handset 28, such as the TRIMLINE handset, that has a dial 29 and a recall pushbutton 30 in addition to a receiver 32 and transmitter 34. The dial 29 operates a normally closed pulsing switch P′ (FIG. 4) and the recall pushbutton 30 operates a normally closed recall switch RL (FIG. 4) the latter permitting the user to interrupt the telephone line without having to operate a switch hook 35 incorporated in a support 36 for the handset 28. The switch hook 35 actuates a hook switch HS having three pair of normally open contacts $HS_1$ (FIG. 4) and $HS_2$ (FIG. 9).

The handset 28 in conjunction with a mode key 38 and a channel key 40 is used to record messages, check the recorded message, and to make calls from the facility at which the reporting set is located. The mode key 38 includes five buttons respectively labeled "CLEAR," "PLAY," "RECORD," "-START," and "REPORT." The PLAY, RECORD, and REPORT buttons are used to select a particular mode of operation for the reporting set. The CLEAR button is used if the reporting set is in operation due to the occurrence of one or more events and the user desires to terminate the report attempt, while the START button is used to initiate the operation of the reporting set in the record or play modes. The PLAY, RECORD, and REPORT buttons are mutually exclusive and latching so that when one is depressed it releases the previously depressed button and is itself latched in a downward position. Both the CLEAR and START buttons, on the other hand, are nonlatching and not mutually exclusive with any of the other buttons. The PLAY button includes a lamp PLP (FIG. 5) therein that is illuminated when the reporting set is in the play mode, and the RECORD button includes a lamp RLP therein that is illuminated to inform the user when he may record.

Figure 10:
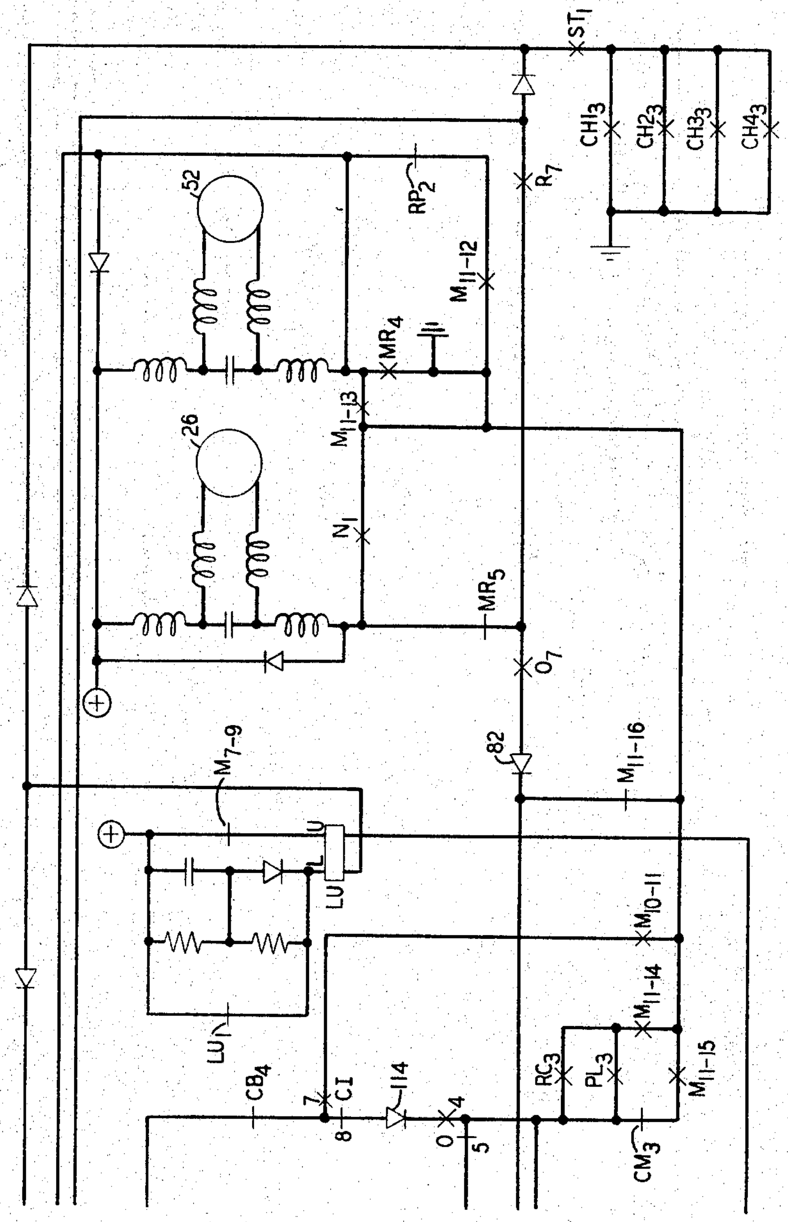

The CLEAR button actuates three pairs of normally open contacts $CL_1$ (FIG. 6), $CL_2$ (FIG. 9), and $CL_3$, and two transfers, the first comprising a pair of normally open contacts $CL_4$ and a pair of normally closed contacts $CL_5$ and the second comprising a pair of normally open contacts $CL_6$ and a pair of normally closed contacts $CL_7$. The PLAY and RECORD buttons both operate three pairs of normally open contacts, the PLAY contacts comprising $PL_1$ (FIG. 10), $PL_2$ (FIG. 4), and $PL_3$ (FIG. 5) and the RECORD contacts comprising $RC_1$, $RC_2$ (FIG. 4), and $RC_3$ (FIG. 10). The START button actuates one pair of normally open contacts $ST_1$ and the REPORT button actuates two paris of normally closed contacts $RP_1$ (FIG. 9) and $RP_2$ (FIG. 10).

Figure 7:
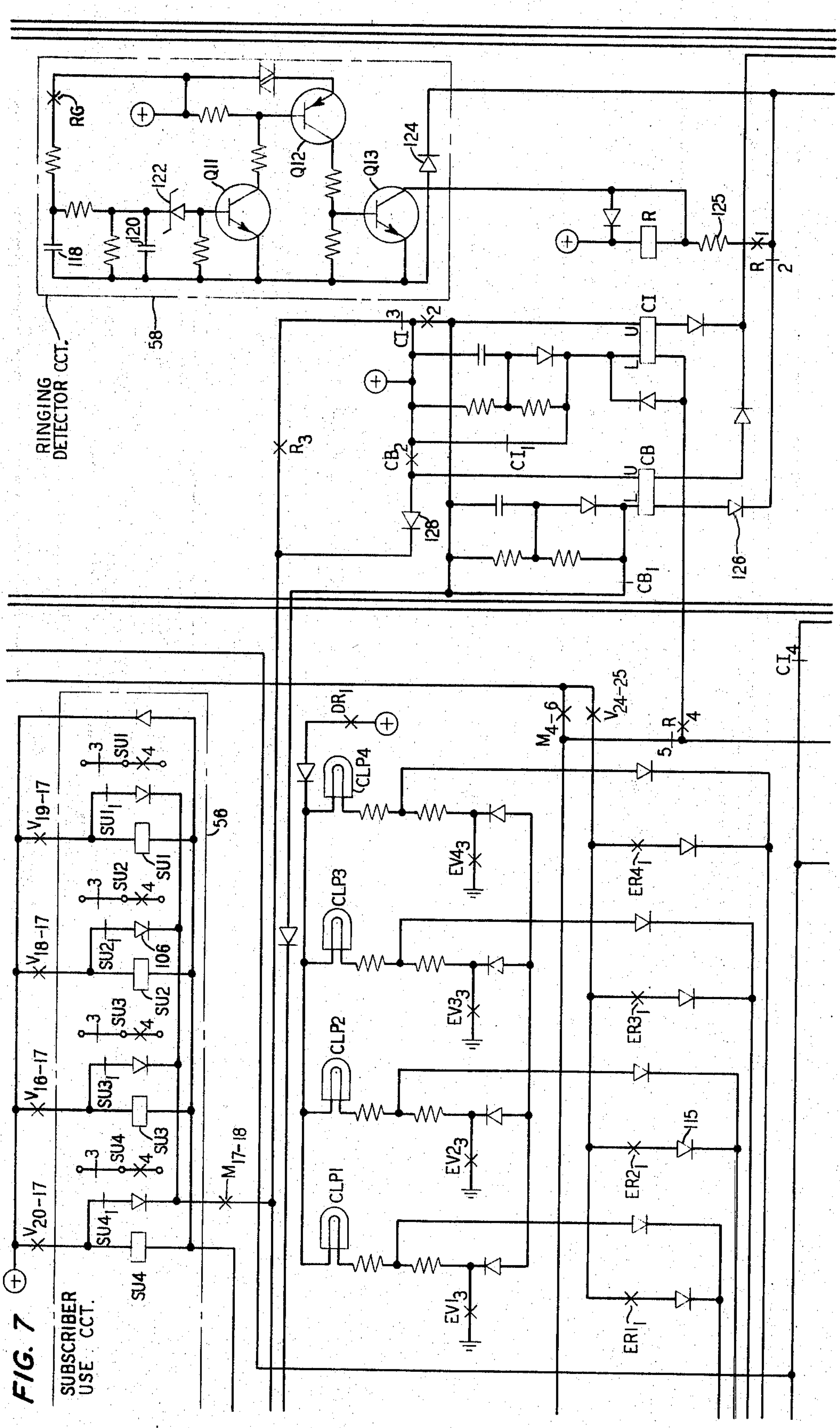

The normal condition of the CLEAR, PLAY, RECORD, and START buttons is when they are released, but the normal condition of the REPORT button is considered to be when it is depressed. Furthermore, the door 22 includes a plunger 42 that engages the REPORT button upon the closing of the door to assure that the button is in a depressed condition when the person using the reporting set terminates his use. The plunger 42 is itself depressed by the engagement with the REPORT button to operate a pair of normally open contacts $DR_1$ (FIG. 7). Like the REPORT button, the normal condition of the door plunger 44 is when it is depressed.

The channel key 40 has four buttons respectively labeled 1, 2, 3 and 4. Each button corresponds to an individual track on a continuous loop of magnetic tape (not shown), and when a channel button is depressed, it serves to set up circuitry for recording or checking a message on the corresponding track. During recording or playing, the tape is driven by a motor 44 (FIG. 10) past a four track head 45 (FIG. 5), the head including an individual erase winding EW1 through EW4 and an individual record-play winding RPW1 through RPW4 for each track. Each track corresponds to an individual event and generally the message recorded on each track recites the location of the reporting set and the occurrence of the particular event.

The channel buttons are mutually exclusive and latching, and each of the buttons when depressed actuates a common switch having three pairs of normally closed contacts $CM_1$ (FIG. 6), CM2, and $CM_3$ (FIG. 10). In addition, each button when depressed respectively actuates an individual channel switch CH1 through CH4 each having three pairs of normally open contacts designated by subnumerals 1 (in FIG. 5), 2, and 3 (FIG. 10).

Each of the buttons includes an individual lamp CLP1 through CLP4 therein that is illuminated when the door 22 is open and when the event that it is associated with has occurred but has not been reported. Furthermore, the lamp is illuminated more brightly when the event is in the process of being reported. Consequently, a person using the reporting set at its location is informed which events have occurred but have not been reported and which one is in the process of being reported.

The position below the channel key 40 is an event reporting key 48 having four bistable rocker buttons respectively labeled 1, 2, 3 and 4. The buttons are used to control the calling cycle of the reporting set for each of the four events that are monitored. When a button is in the "3 Times" position, which is when the upper end is depressed, the reporting set sequentially calls each of the three telephone numbers selected for that event once and then returns to a standby condition. When, on the other hand, a button is in the "Indefinitely" position, which is when the lower end is down, the reporting set sequentially calls each of the three telephone numbers for that event continuously until a resetting control signal is received or until a higher priority event occurs. The buttons respectively actuate switches ER1 through ER4 (FIG. 7), each switch having a pair of contacts that are open when the button associated therewith is in the "Idefinitely" position and closed when the button is in the "3 Times" position.

Located adjacent to the reporting key 48 is a priority key 50 having a single bistable rocker button. This button is used to control the sequence of reporting when two or more events occur in short succession of one another. When the button is in the "Event 1" position, which is when the upper end of the button is depressed, event 1 has the highest priority, followed by events 2, 3 and 4. In addition, if during the reporting of one event an event of higher priority occurs, the reporting of the lower priority event is terminated at the end of the call then being made to permit the reporting of the higher priority event. The reporting of the lower priority event is reinitiated, provided that the resetting control signal had not been sent during the earlier call, upon the completion of the reporting of the higher priority event as determined by the event reporting key 48.

When the button of the priority key 50 is in the "Equal" position, which is when the lower end of the button is down, the events are reported consecutively in the sequence 4, 3, 2, and 1. In this position, if event 2 occurs during the reporting of event 4, the reporting of event 4 continues until all three calls selected for that event have been made. The reporting set then makes the three calls selected for event 2, and if the buttons of the event reporting key 48 are set in the "Indefinitely" position, the reporting set continues to switch back and forth between the event 4 and event 2 calls until a resetting control signal is received.

The button of the priority key 50 actuates a switch having three transfers and in the "Event 1" position of the button, the transfers consist of three pairs of closed contacts $PR_1$ (in FIG. 9), $PR_2$, and $PR_3$, and three pairs of open contacts $PR_4$, $PR_5$, and $PR_6$.

Figure 3:
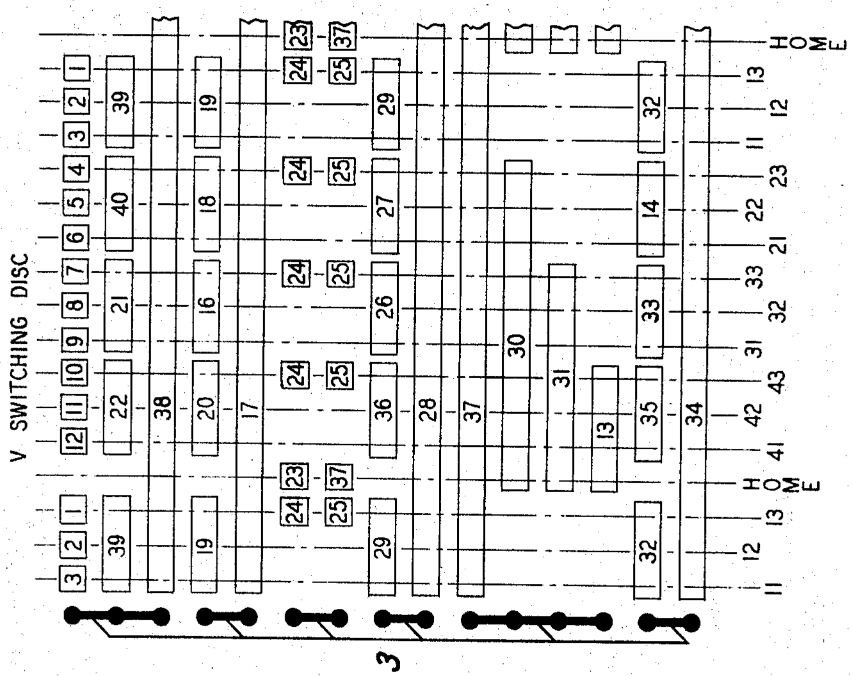
FIGS. 2 and 3 are schematic representations of printed circuit members that provide the switching logic for the reporting set.
Figure 2:
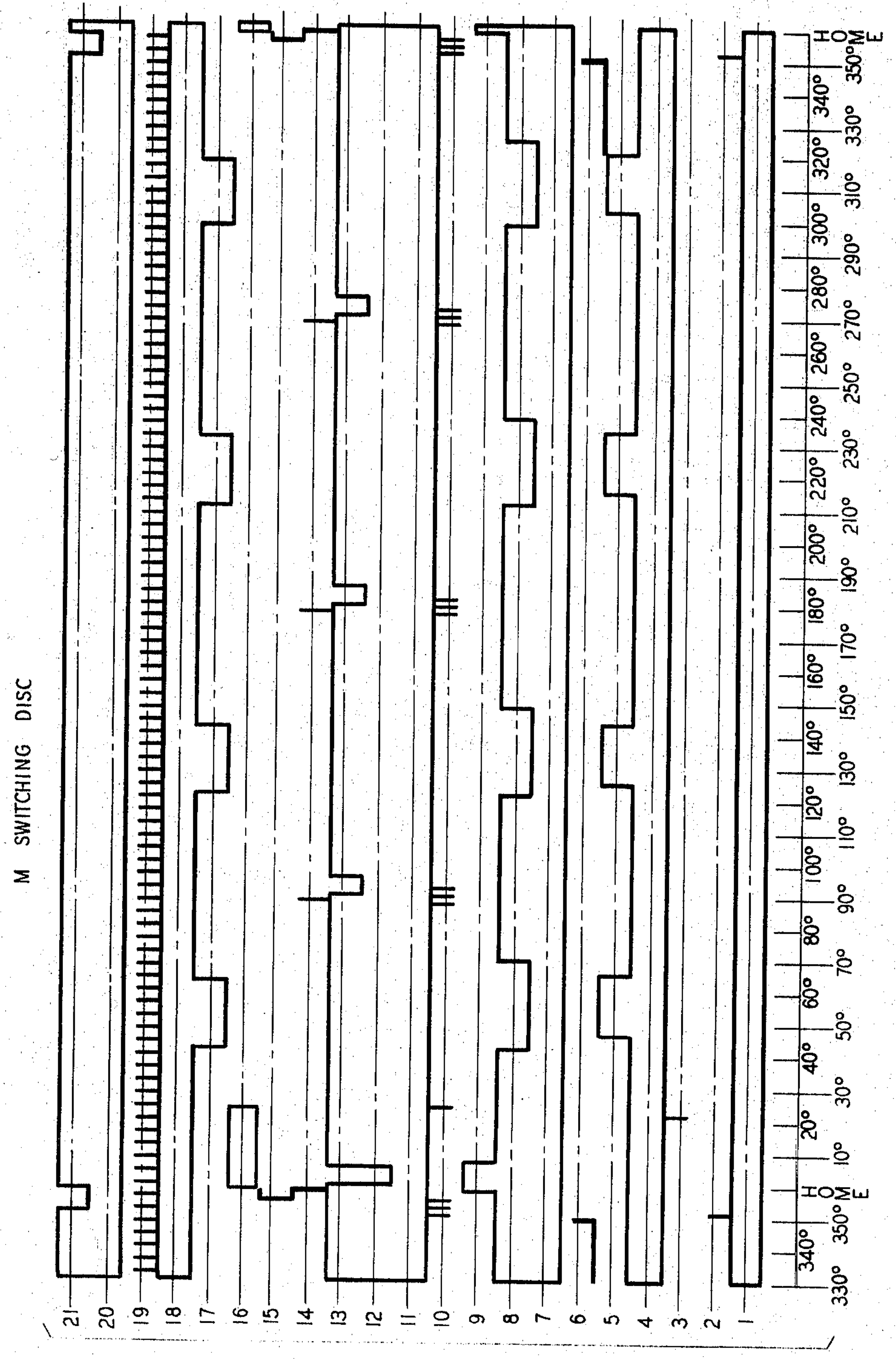

Turning now to FIGS. 2 and 3, the switching logic for the reporting set is provided by relative motion between an M switching disc and a group of contacts associated therewith and a V switching disc and a group of contacts associated therewith. Both of the M and V discs comprise a dielectric member having a particular conductive pattern thereon, and each group of contacts is spaced along a radius of the disc with which it is associated.

A linear layout of the conductive pattern of the M disc is shown in FIG. 2. In addition, the positions that the contacts occupy and the paths that they describe with respect to the conductive pattern are shown as broken lines extending along the length of the FIG. The home position of the contacts with respect to the conductive pattern is also displayed, the home position being the position that the contacts occupy when the reporting set is in the standby condition. Finally, angular displacement with respect to the home position is indicated along the bottom of the FIG.

The M disc has 21 contacts extending into engagement with the conductive pattern thereon. The individual contacts are electrically insulated from one another, and the M disc is rotated past the contacts by a motor 52 (FIG. 10). The conductive pattern interconnects various ones of the contacts as the M disc rotates and this interaction provides the equivalent of 15 switches designated $M_{1-2}$, $M_{3-4}$, $M_{4-5}$, $M_{4-6}$, $M_{7-8}$, $M_{7-9}$, $M_{10-11}$, $M_{11-12}$, $M_{11-13}$, $M_{11-14}$, $M_{11-15}$, $M_{11-16}$, $M_{17-18}$, $M_{18-19}$, and $M_{20-21}$. The switches $M_{7-8}$, $M_{7-9}$, $M_{11-16}$, and $M_{20-21}$ are normally closed and all the rest are normally open. The switches open and close in accordance with the configuration of the conduction pattern.

A linear layout of the conductive pattern of the V switching disc is shown in FIG. 3, the individual conductive paths being numbered 1 through 40. The conductive paths are electrically connected through the disc into the circuitry of the set, and a wiper arm rotates the contacts over the disc in discrete steps under the power of a stepping relay SP (FIG. 9). The wiper arm and thereby the contacts occupy 13 discrete positions with respect to the conductive pattern and these positions are indicated along the bottom of the FIG. The home position is occupied when the reporting set is in the standby condition.

One of the other positions is occupied when the the reporting set is reporting a particular event and making a particular one of the calls in the reporting of that event. The event number is indicated by the first number of each position and the call number is indicated by the second number of each position. Thus the position 21 is occupied when the first call in the reporting of event 2 is being made.

Fifteen contacts extend into engagement with the conductive pattern of the V switching disc, and adjacent contacts are electrically connected to one another in the manner shown along the left side of the FIG. The contacts interconnect various ones of the conductive paths in each discrete position, and this interaction provides the equivalent of 33 switches designated $V_{1-38}$ through $V_{12-38}$, $V_{22-38}$, $V_{21-38}$, $V_{40-38}$, $V_{39-38}$, $V_{20-17}$, $V_{16-17}$, $V_{18-17}$, $V_{19-17}$, $V_{24-25}$, $V_{36-28}$, $V_{26-28}$, $V_{27-28}$, $V_{29-28}$, $V_{30-37}$, $V_{31-37}$, $V_{23-37}$, $V_{13-37}$, $V_{35-34}$, $V_{33-34}$, $V_{14-34}$, and $V_{32-34}$. The switches $V_{23-37}$, $V_{30-37}$, $V_{31-37}$, and $V_{13-37}$ are normally closed while all the rest are normally open.

Figure 6:
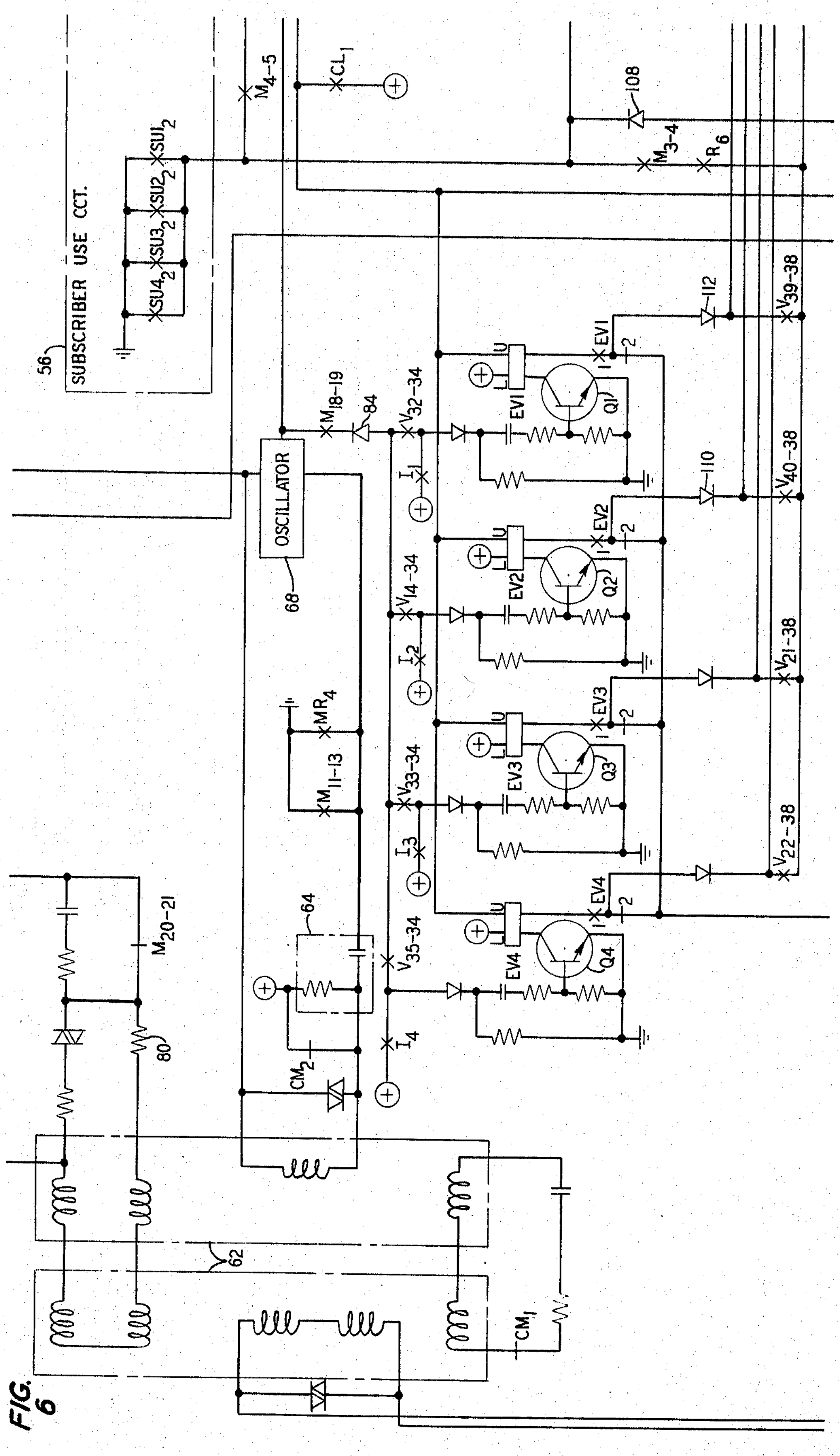

Referring now to FIGS. 4 through 10, the circuit of the reporting set includes a number of relays in addition to the calling relay C (FIG. 5), the motor relay MR, and the stepping relay SP (FIG. 9). These relays comprise a play relay PY, a record relay RD, four event relays EV1 through EV4 (FIG. 6), four subscriber relays SU1 through SU4 (FIG. 7), a ringing relay R, a call-in relay CI, a call-back relay CB, an operate relay O (FIG. 9), and a local use relay LU (FIG. 10). The circuit also includes five major subcircuits in addition to the automatic call transmitter circuit 25 (FIG. 5). These subcircuits consist of an amplifier 54 (FIG. 4), a bias circuit 55, a subscriber use circuit 56 (FIGS. 6 and 7), a ringing detector circuit 58 (FIG. 7), a control signal detector circuit 60 (FIGS. 8 and 9), and an oscillator 68 (FIG. 6). The aforegoing and other elements of the complete circuit will now be examined in the context of the operation of the reporting set.

DESCRIPTION OF OPERATION

Setting Up

At the time that the reporting set is installed, the subscriber provides an individual pair of normally open input contacts I for each of the four events to be monitored, each pair of input contacts being arranged so that the contacts close when the event with which the contacts are associated occurs. In addition, the subscriber assigns each event with a number 1 through 4 in accordance with its significance from a priority standpoint, and each pair of input contacts I is given the same number as its associated event and is connected into the circuit of the event relay EV (FIG. 6) having the same number.

The reporting set is thereafter connected to a telephone line serving the location and to a standard power source, the voltage of the power source being rectified and reduced by a power circuit (not shown). The messages to be transmitted upon the occurrence of each event are then recorded on the tape.

Record Mode

A message is recorded on an individual channel by first opening the door 22 (FIG. 1) of the housing 20 to obtain access to the controls. The plunger 42 on the door is thereby permitted to move outward and the contacts $DR_1$ (FIG. 7) close. As a result, if the reporting set is in the process of reporting the occurrence of one or more events, the lamps CLP in the buttons of the channel key 40 (FIG. 1) corresponding to these events are illuminated to inform the user of that fact.

If the user wishes to terminate the reporting of the events so as to be able to begin to record, he depresses the CLEAR button of the mode key 38 until all the lamps CLP in the buttons of the channel key 40 are extinguished. Contacts $CL_1$ (FIG. 6) close in the power path of the unlatch windings of the event relays EV, and contacts $CL_2$ (FIG. 9) close to connect the stepping relay SP to ground through one or more of the V37 switches. Contacts $CL_3$ close and connect the unlatch windings of the operate relay 0, the motor relay MR, (FIG. 5) the call-back relay CB, (FIG. 7) and the call-in relay CI to ground and connect the latch winding of the local use relay LU (FIG. 10) to ground. Finally, contacts $CL_4$ (FIG. 9) close in the power path of the unlatch winding of the operate relay 0 while contacts $CL_5$ open in the power path of the latch winding, and contacts $CL_6$ close in the ground path of the unlatch windings of the event relays EV (FIG. 6) while contacts $CL_7$ (FIG. 9) open in the ground path of the unlatch winding of the local use relay LU (FIG. 10). The result of the above is that the stepping relay SP is stepped to its home position, and all relays that were previously latched are unlatched while the local use relay LU is latched.

The latching of the local use relay LU opens contacts $LU_1$ in the power path of the latch winding, and current flow through the winding terminates after a lapse of time provided by the charging of a capacitor in parallel with the contacts, the time lapse assuring secure latching of the relay. The same arrangement is employed with respect to the latching of the operate relay 0 (FIG. 9), the call-in relay CI (FIG. 7), the call-back relay CB, and the motor relay MR (FIG. 5). The latching of the local use relay LU further closes contacts $LU_2$ (FIG. 9) in the ground path of the unlatch winding of the LU relay and opens contact $LU_3$ in the ground path of the stepping relay SP and the operate relay 0. This prevents event occurrences from interfering with the local use of the reporting set.

The user thereafter depresses the RECORD button (FIG. 1) of the mode key 38, the button being latched in the downward position and at the same time releasing the depressed REPORT button. The release of the REPORT button opens contacts $RP_1$ (FIG. 9) in the ground path of the stepping relay SP and in the ground path of the latch winding of the operate relay 0 to also prevent event occurrences from interfering with the local use of the reporting set. In addition, contacts $RP_2$ (FIG. 10) open to place the motor 52 under the control of the switch $M_{11}$—$_{13}$ rather than the switch $M_{11}$—$_{12}$.

Figure 4:
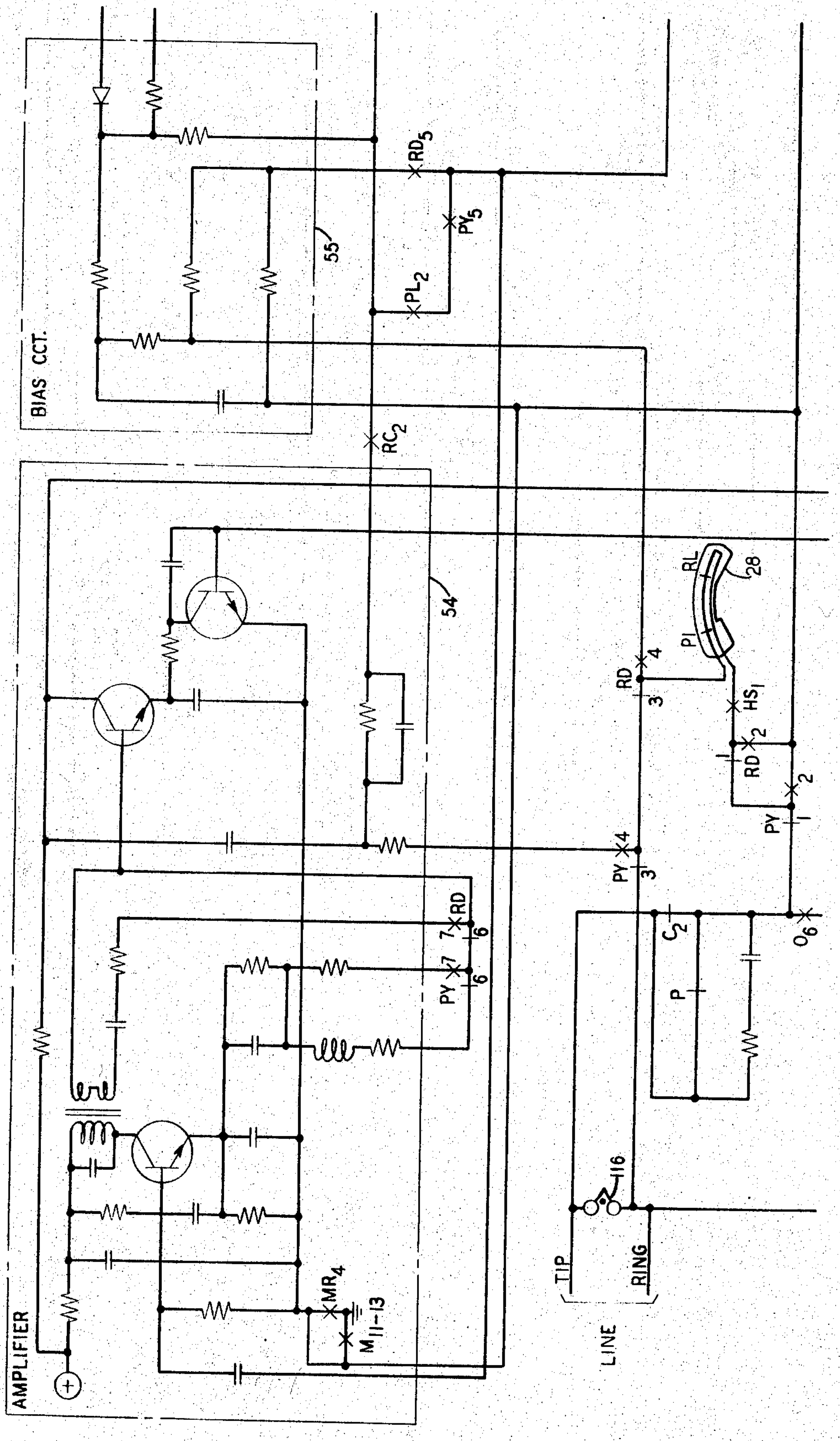
FIGS. 4 through 10 combine to provide a schematic circuit diagram of the reporting set.

The latching of the RECORD button closes contacts $RC_1$ (FIG. 5) to energize the record relay RD and apply power to the record lamp RLP and the bias circuit 55 (FIG. 4). In addition, the contacts $RC_2$ close and connect the output of the amplifier 54 to the record play windings RPW of the head 45 (FIG. 5), and contacts $RC_3$ (FIG. 10) close in the ground path of the unlatch winding of the motor relay MR (FIG. 5).

The energized record relay RD opens contacts $RD_1$ (FIG. 4) and $RD_3$ to disconnect the handset 28 from across the telephone line and closes contacts $RD_2$ and $RD_4$ to connect the handset to the bias circuit 55. Contacts $RD_5$ close to connect the output of the bias circuit 55 to the input of the amplifier 54, while in the amplifier, contacts $RD_6$ open to disconnect a report frequency shaping network and contact $RD_7$ close to connect a record frequency shaping network.

The button on the channel key 40 (FIG. 1) for a selected channel is then depressed and latched in a downward position. Thus if the message for event one is to be recorded, the button labeled 1 is depressed. Contacts $CH1_1$ (FIG. 5) and $CH1_2$ close and respectively energize the erase winding EW1 and connect the record play winding RPW1 to the output of the amplifier 54 (FIG. 4). In addition, contacts $CH1_3$ (FIG. 10) close in the ground path of the latch winding of the motor relay MR (FIG. 5).

The depression of the channel button also operates the common switch of the channel key 40 to open contacts $CM_1$ (FIG. 6) and $CM_2$. The contacts $CM_1$ open a balancing winding of a hybrid network 62 to prevent current flow in the winding during recording and playing, and the contacts $CM_2$ remove a shunt from across the resistor of a filter 64 so that the filter can function during recording and playing. In addition, the common switch opens contacts $CM_3$ (FIG. 10) in the ground path of the unlatch winding of the motor relay MR (FIG. 5).

The next step in the recording of a message is to remove the handset 28 (FIG. 1) from the support 36. The hook switch is thereby operated to close contacts $HS_1$ (FIG. 4) to connect the handset 28 across the bias circuit 55 and open contacts $HS_2$ (FIG. 9) to further prevent event occurrences from interrupting the use of the telephone. This last is achieved since the contacts $HS_2$ are in the ground path of the stepping relay SP and the latch winding of the operate relay 0.

After removing the handset 28 (FIG. 1), the START button of the mode key 38 is briefly depressed. Contacts $ST_1$ (FIG. 10) close and in combination with the closed contacts $CH1_3$ energize the latch winding of the local use relay LU if it was not previously energized by the actuation of the CLEAR button of the mode key 38. Closed contacts $ST_1$ also act in combination with closed contacts $CH1_3$ to energize the latch winding of the motor relay MR (FIG. 5).

Contacts $MR_1$ open and deenergize the latch winding of the motor relay MR after latching has taken place, while contacts $MR_2$ close in the power path of the unlatch winding and contacts $MR_3$ open in the power path of the latch winding of the calling relay C, the operate relay 0 (FIG. 9) and in the energizing path of the stepping relay SP. Contacts $MR_4$ (FIG. 4) close to connect the amplifier 54, the filter 64 (FIG. 6), the oscillator 68, and the control signal detector circuit 60 (FIG. 8) to ground. In addition, the closed contacts $MR_4$ energize the motor 52 (FIG. 10) and in combination with closed contacts $RC_1$ energize the lamp RLP (FIG. 5) in the RECORD button (FIG. 1). Contacts $MR_5$ (FIG. 10) open in the ground path of the motor 26.

The illumination of the RECORD button (FIG. 1) informs the user that he may commence to record the desired message, which he does by speaking into the transmitter 25 of the handset 28. The bias circuit 55 (FIG. 4) applies bias to the transmitter 25 and to the record play winding RPW1 (FIG. 5) through closed contacts $CH1_2$. In addition, erase current is applied to the erase winding EW1 through closed contacts $CH1_1$.

The signals generated by speaking into the transmitter 25 (FIG. 4) are amplified by the amplifier 54 and applied to the record play winding RPW1 (FIG. 5). A loop of tape (not shown) is driven past the head 45 by the motor 52 (FIG. 10) and any previously recorded message on channel 1 of the tape is erased as the new message is recorded. As indicated previously, the message advantageously gives the location of the reporting set and states the occurrence of the condition that has been selected by the subscriber to be event 1.

The motor 52 also rotates the M disc (FIG. 2), and shortly after rotation commences, the switches $M_{11}$—$_{13}$ and $M_{11}$—$_{12}$ close. The switch $M_{11}$—$_{13}$ closes in parallel with the closed contacts $MR_4$ to provide an alternative path to ground for the amplifier 54 (FIG. 4), the record lamp RLP (FIG. 5), filter 64 (FIG. 6), the oscillator 68, the control signal detector circuit 60 (FIG. 8) and the motor 52 (FIG. 10) while the switch $M_{11}$—$_{12}$ closes in still another alternate ground path of the motor 52. This is immediately followed by the opening of the switch $M_7$—$_9$ in the power path of the unlatch winding of the local use relay LU to prevent the unlatching of the relay until just before the M disc returns to its home position.

About 19 seconds are available for the recording of a message, this being the time required for the M disc to rotate through 90°. Just before the end of this period, the switch $M_{11}$—$_{14}$ closes and unlatches the motor relay $MR_1$ a path being provided from the power source through closed contacts $MR_2$ (FIG. 5), the unlatch winding, closed contacts $RC_3$ (FIG. 10), and the closed switch $M_{11}$—$_{14}$ to ground. The motor relay MR contacts thereby return to their normal condition. Then at the end of the recording period, the switch $M_{11}$—$_{13}$ reopens and deenergizes the amplifier 54 (FIG. 4), the filter 64 (FIG. 6), and the motor 52 (FIG. 10) and extinguishes the lamp RLP (FIG. 5) in the RECORD button.

With the recording of the message on channel 1 completed, the user may go on to record the messages on channels 2, 3 and 4 by merely depressing the corresponding button on the channel key 40 (FIG. 1), thereby releasing the previously depressed button, briefly depressing the START button on the mode key 38, and speaking the messages into the transmitter 34 of the handset 28 while the RECORD button is illuminated.

Play Mode

To check the recorded messages, the user depresses the PLAY button of the mode key 38, the PLAY button being latched downward and at the same time releasing the RECORD button. The released RECORD button reopens contacts $RC_1$ (FIG. 5) to deenergize the record relay RD and disconnect the record lamp RLP and the bias circuit 55 (FIG. 4) from the power source, reopens contact $RC_2$ to disconnect the output of the amplifier 54 from the record play windings RPW (FIG. 5) of the head 45, and reopens the contacts $RC_3$ (FIG. 10) in the ground path of the unlatch winding of the motor relay MR (FIG. 5). The latched PLAY button closes contacts $PL_1$ to energize the play relay PY and to connect the lamp PLP in the PLAY button to the power source, closes contacts $PL_2$ (FIG. 4) in the path between the input of the amplifier 54 and the record play windings RPW (FIG. 5) of the head 45, and closes contacts $PL_3$ (FIG. 10) in the ground path of the unlatch winding of the motor relay MR.

With the deenergization of the record relay RD and the energization of the play relay PY, contacts $RD_1$ (FIG. 4) and $RD_3$ reclose to connect the handset 28 to the telephone line while contacts $PY_1$ and $PY_3$ open to disconnect the handset from the telephone line. Contacts $RD_2$ and $RD_4$ reopen to disconnect the handset 28 from the bias circuit 55 and contacts $PY_2$ and $PY_4$ close to connect the handset to the output of the amplifier 54. Contacts $RD_5$ reopen to disconnect the output of the bias circuit 55 from the input of the amplifier 54 and contacts $PY_5$ close in the path between the input of the amplifier and the record play windings RPW (FIG. 5) of the head 45. Finally, in the amplifier 54 contacts $RD_6$ reclose and contacts $PY_7$ close to connect the play frequency shaping network. Contacts $PY_6$ open to disconnect the report frequency shaping network and contacts $RD_7$ reopen to disconnect the record frequency shaping network.

The button on the channel key 40 (FIG. 1) corresponding to the desired message is then depressed, as, for example, the button labeled 1 is depressed to hear the message for event 1. The depressed button serves the same functions as described with respect to the record mode except that the closed contacts $CH1_1$ (FIG. 5) serve no function and the closed contacts $CH1_2$ in combination with the closed contacts $PL_2$ (FIG. 4) and $PY_5$ connect the record play winding RPW1 to the input of the amplifier 54.

The user thereafter places the receiver 32 (FIG. 1) of the handset 28 to his ear and briefly depresses the START button of the mode key 38. The actuation of the START button and the resultant energization of the motor relay MR (FIG. 5) and local use relay LU (FIG. 10) serve the same function as in the record mode except that the closed contacts $MR_4$ act in combination with the closed contacts $PL_1$ (FIG. 5) to energize the lamp PLP in the PLAY button.

The energization of the motor 52 (FIG. 10) moves the loop of tape past the head 45 (FIG. 5), and the signals generated in the record play winding RPW1 are amplified by the amplifier 54 (FIG. 4) and applied to the receiver 32 of the handset 28. The energization of the motor 52 also initiates the rotation of the M disc with essentially the same results as described with respect to the record mode. Thus, at the end of a complete traversal of the loop of tape, the motor relay MR (FIG. 5) is unlatched and the play lamp PLP and motor 52 are deenergized.

To check the other recorded messages, it is only necessary to depress the corresponding button on the channel key 40 (FIG. 1) and again depress the START button on the mode key 38. When the recording and checking of the messages are completed, the handset 28 is placed back on the support 36. The hook switch is thereby operated and contacts $HS_1$ (FIG. 4) reopen to disconnect the handset 28 and contacts $HS_2$ (FIG. 9) reclose in the path to ground of the stepping relay SP and the latch winding of relay 0.

The REPORT button of the mode key 38 (FIG. 1) is then depressed, the button being latched in a downward position and at the same time releasing the PLAY button and whatever button is depressed on the channel key 40. The release of the PLAY and CHANNEL buttons returns the contacts PL, $CM_1$ and $CM_2$ to their normal condition whereby the play relay PY (FIG. 5) is deenergized, the balancing winding on the hybrid network 62 (FIG. 6) is restored, and the shunt across the resistor of the filter 64 is restored. The deenergization of the play relay PY returns its contacts to their normal condition, resulting in the connection of the report frequency shaping network in the amplifier 54 (FIG. 4) and the disconnection of the play frequency shaping network.

Finally, the depression of the REPORT button returns the RP contacts to their normal condition. If the M disc (FIG. 2) is not in the home position, reclosed contacts $RP_2$ (FIG. 10) in combination with the closed switch $M_{11}$—$_{12}$ energizes the motor 52. The energized motor 52 rotates the M disc and when it gets to the home position, the switch $M_{11}$—$_{12}$ reopens to deenergize the motor and the switch $M_7$—$_9$ recloses in the energizing path of the unlatch winding of the local use relay LU. Thus, when the M disc is in the home position, reclosed contacts $RP_1$ (FIG. 9) in combination with closed contacts $HS_2$, $CL_4$ (FIG. 7), $CL_6$ (FIG. 9), $N_2$, $LU_2$, and closed switch $M_7$—$_9$ (FIG. 10) energize the unlatch winding of the local use relay LU. The reclosing of the contacts $LU_3$ (FIG. 9) permits the energization of the stepping relay SP and the latch winding of the operate relay 0. The reporting set is at this time in the report mode.

Report Mode

In the report mode, the reporting set is able to respond to the occurrence of one or more of the four selected events. Assuming that event two occurs, the input contacts $I_2$ (FIG. 6) close and energize a timing circuit including transistor Q2. The timing circuit when energized provides a several second path to ground for the latch winding of the event relay EV2, during which time the relay is latched. The timing circuit thereafter prevents current drain through the latch winding and prevents the relay from relatching if the input contacts I are closed when reporting is completed.

The latching of the event relay EV2 closes contacts $EV2_1$ in the ground path of the unlatch winding and opens contacts $EV2_2$ in the ground path of the stepping relay SP (FIG. 9). In addition, contacts $EV2_3$ (FIG. 7) close in the ground path of the channel lamp CLP2, contacts $EV2_4$ (FIG. 9) close in the ground path of the stepping relay SP, and contacts $EV2_5$ close in the ground path of the operate relay 0.

The stepping relay SP is energized through a path extending from the power source through closed contacts $MR_3$ (FIG. 5), $CI_5$ (FIG. 9), the stepping relay SP winding, closed contacts $SP_1$, a diode 75, closed contacts $EV2_4$, $PR_2$, closed switch $V_{31}$—$_{37}$, closed contacts $LU_3$, $N_2$, $CL_6$, $CL_4$ (FIG. 7), $HS_2$ (FIG. 9) and $RP_1$ to ground. The energized relay rotates the wiper arm one step from the home position on the V disc (FIG. 3) thereby placing it in position 41 and opens contacts $SP_1$ (FIG. 9) to interrupt the energizing path. The stepping relay SP is consequently deenergized whereupon contacts $SP_1$ reclose and again energize the relay to rotate the wiper arm to position 42 (FIG. 3). This stepping of the wiper arm continues until it is moved to position 21 at which time the switch $V_{31}$—$_{37}$ (FIG. 9) opens and terminates the energization of the stepping relay SP. It is seen that in position 21 the switches $V_6$—38, $V_{40}$—$_{38}$, $V_{18}$—$_{17}$, $V_{27}$—$_{28}$, $V_{30}$—$_{37}$ and $V_{14}$—$_{34}$ are closed.

The switch $V_6$—38 (FIG. 5) closes in the number selection matrix to select the first number to be called by the automatic call transmitter, and the switch $V_{40}$—$_{38}$ (FIG. 6) closes in the ground path of the unlatch winding of the event relay EV2. Furthermore, the switch $V_{18}$—$_{17}$ (FIG. 7) closes in the power path of the subscriber use relay SU2, the switch $V_{27}$—$_{28}$ (FIG. 5) closes to connect the record play winding RPW2 to the input of the amplifier 54 (FIG. 4), and the switch $V_{14}$—$_{34}$ (FIG. 6) closes in the biasing path of the oscillator 68.

The latch winding of the operate relay 0 (FIG. 9) is also energized at this time, a path extending from the power source through closed contacts $MR_3$ (FIG. 5), $CL_5$ (FIG. 9) $0_1$, the latch winding, a diode 76, closed contacts $EV2_5$, closed switch $V_{31}$—$_{37}$, closed contacts $LU_3$, $N_2$, $CL_6$, $CL_4$ (FIG. 7), $HS_2$ (FIG. 9) and $RP_1$ to ground. Contacts $0_1$ open to terminate current flow through the winding after the relay has latched while contacts $0_2$ close in the power path of the unlatch winding, and contacts $0_3$ open in the power path of the unlatch winding of the event relays EV (FIG. 6). In addition, contacts $0_4$ (FIG. 10) close in the ground path of the stepping relay SP, and contacts $0_5$ open in the ground path of the unlatch windings of the call-back relay CB (FIG. 7) and call-in relay CI. Furthermore, contacts $0_6$ (FIG. 4) close to seize the telephone line, a path being provided from the tip conductor through closed contacts $C_2$, $0_6$, closed switch $M_{20}$—$_{21}$, a resistor 80, and windings of the hybrid network 62 to the ring conductor, and contacts $0_7$ (FIG. 10) close to energize the motor 26, a path being provided from the power source through the motor, closed contacts $MR_5$, $0_7$, a diode 82 and the closed switch $M_{11}$—$_{16}$ to ground.

The energization of the motor 26 initiates the operation of the automatic call transmitter (FIG. 5), and several seconds after the telephone line is seized the call transmitter commences to dial a telephone number D that has been preselected as the first call for the second event. For each digit, the pulsing switch P (FIG. 4) opens and closes 10 times, but no pulses are transmitted unless and until contacts $C_2$ are opened by the latching of the calling relay C (FIG. 5). The latch winding of the calling relay C is energized when a path is completed through the switching matrix of the call transmitter in the manner previously set forth. A path is then provided from the power source through closed contacts $MR_3$, the latch winding, closed contacts F, $D_d$, $S_D$, D of the number switch $N_2$-—1, the closed switch $V_6$—38, closed contacts $CI_4$ (FIG. 7), $HS_2$ (FIG. 9) and $RP_1$ to ground. Upon the energization of the latch winding of the calling relay C, the contacts $C_2$ (FIG. 4) open and the pulsing switch P commences to interrupt the telephone line to transmit pulses thereover.

After the pulses corresponding to the first digit have been transmitted, contacts G (FIG. 5) close and in combination with the closed contacts $C_1$ energize the unlatch winding of the calling relay C. Thus a path through the switching matrix is provided to latch and unlatch the calling relay C for each digit that is dialed. In addition, shortly after the motor 26 (FIG. 10) is energized it closes contacts $N_1$ to provide itself an alternate energizing path and it opens contacts $N_2$ (FIG. 9) in the path to ground of the stepping relay SP to prevent the stepping relay from operating should another event occur during the dialing.

After the last digit is dialed, the latch winding of the motor relay MR (FIG. 5) is energized by the closing of the contacts $DS_D$, a path being provided from the power source through closed contacts $MR_1$, the latch winding, closed contacts $DS_D$, $S_D$, D of the number switch $N_2$—1, the closed switch $V_6$—38, closed contacts $CI_4$ (FIG. 7), $HS_2$ (FIG. 9) and $RP_1$ to ground. Contacts $MR_1$ (FIG. 5) open and deenergize the latch winding after latching has taken place, and contacts $MR_2$ close in the energizing path of the unlatch winding. Contacts $MR_3$ open in the power path of the latch winding of the calling relay C, thereby preventing any further transmission of dial pulses, and in the power path of the stepping relay SP (FIG. 7), thereby preventing any further operation of the stepping relay should another event occur during the transmission of the prerecorded message. Furthermore, contacts $MR_4$ close to provide ground for the amplifier 54 (FIG. 4), the oscillator 68 (FIG. 6), the control signal detector 60 (FIG. 8), and the motor 52 (FIG. 10), while contacts $MR_5$ open in one of the ground paths of the motor 26.

The motor 52 is energized and commences to rotate the M disc (FIG. 2) and move the tape past the head 45 (FIG. 5). The initial rotation of the M DISC closes the switch $M_{11}$—$_{12}$ (FIG. 10) to provide an alternate path to ground for the motor 52, and opens the switch $M_{11}$—$_{16}$ to prevent reenergization of the motor 26 until the M disc returns to its home position. However, the motor 26 continues to run until the calling cycle is completed whereupon contacts $N_1$ reopen and disconnect it from ground, contacts $N_2$ (FIG. 9) reclosing at the same time.

As the tape moves past the head 45 (FIG. 5), the signals recorded on channel 2 of the tape are picked up by the record-play winding RPW2 and applied through the closed switch $V_{27}$—$_{28}$ to the input of the amplifier 54 (FIG. 4), and the amplified signals are transmitted out on the telephone line via the hybrid network 62 (FIG. 6).

At the same time, the rotation of the M disc (FIG. 2) intermittently closes the switch $M_{18}$—$_{19}$, (FIG. 6) and if the alarm condition continues whereby input contacts $I_2$ remain closed, each closure of the switch $M_{18}$—$_{19}$ energizes the oscillator 68, a path being provided from the power source through closed contacts $I_2$, the closed switch $V_{14}$—$_{34}$, a diode 84, the closed switch $M_{18}$—$_{19}$, the oscillator, and closed contacts $MR_4$ to ground. The energized oscillator 68 generates a tone of 2125 hertz and thus an intermittent tone, referred to as the alarm signal, is transmitted out on the telephone line via the hybrid network 62, the alarm signal being superimposed upon the message to inform the called station that the alarm condition continues to exist.

Figure 8:
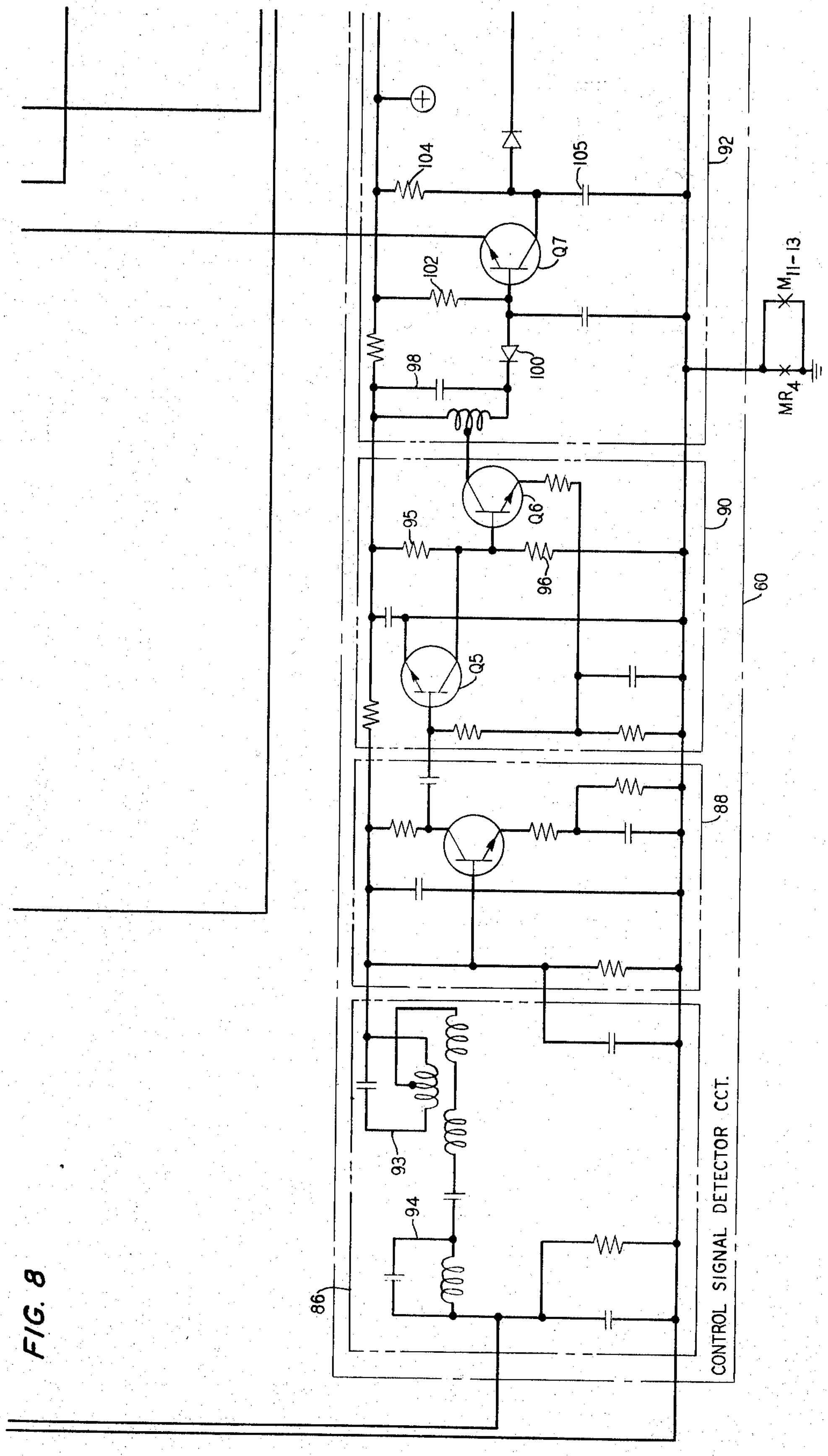

During each calling attempt, the message is repeated four times. Thus time is allowed for some delay in the establishment of the connection with the called station and the answering of the call by the called station. The called station upon hearing the message may, if it is so equipped, transmit a control signal that causes the reporting set to terminate its calling operation and reset to a standby condition. The control signal comprises a tone of 1475 hertz, and it may be generated by an oscillator designed for that specific purpose or by the depression of the digit 3 button on the TOUCH-TONE dial of the called station. The signal when generated is received by the control signal detector circuit 60 (FIG. 8).

The detector circuit 60 comprises an input network 86, an amplifying stage 88, a limiting and driving stage 90, and an output network 92. All signals including both those directed to the reporting set and those transmitted by the set are received by the input network 86 via the hybrid network 62 (FIG. 6). Although the signals transmitted by the set are greatly attenuated by the hybrid network loss, in order to prevent the signal generated by the oscillator 68 from overloading the detector circuit 60 (FIG. 8), the input network 86 includes a trap 93 that blocks this signal. In addition, the input network 86 includes a trap 94 that blocks a signal of 697 hertz which is the companion frequency to 1475 hertz that is generated when the digit 3 button on the TOUCH-TONE dial is depressed.

Other audible signals pass through the amplifying stage 88 and are applied to the base of a transistor Q5 in the limiting and driving stage 90. The transistor Q5 is operated at a minimal bias, the emitter being connected to ground and the base being held just at the turn-on point. Thus the incoming signal causes the transistor Q5 to fluctuate between an on and off condition. When the transistor Q5 turns on, the collector drops to ground potential and when the transistor turns off the collector goes to a voltage determined by resistors 95 and 96 and the potential of the power source. As a result a square wave is provided at the collector, the amplitude of which is dependent upon the power source potential.

In addition, by feeding the square wave to a transistor Q6 and using a sample of average current through this transistor to furnish the bias for the base of transistor Q5, a symmetrical square wave is achieved. The symmetrical square wave is fed into a tank circuit 98 in the output network 92, the tank circuit being connected through a reverse bias diode 100 to a transistor Q7.

The tank circuit 98 is tuned to resonate with the frequency of the control signal and thus it commences to resonate if the square wave is of this frequency. If the tank circuit 98 is driven hard enough, the juncture with the diode 100 will go far enough negative for the diode to conduct, the power source providing a threshold that must be exceeded before the diode conducts.

The transitor Q7 is normally turned on, forward bias for the transistor being provided by a resistor 102, and with the transistor on, current through a resistor 104 is shunted around a capacitor 105. When, however, the diode 100 rectifies the signal appearing in the tank circuit 98, it takes away the forward bias for the transitor Q7 and thereby turns it off. Then the current through the resistor 104 commences to charge the capacitor 105.

If the signal of the proper frequency is sporadic, the transistor Q7 is intermittently turned on, and each time it turns on, the capacitor 105 is completely discharged. If, however, the signal of the proper frequency is continuous, the transistor Q7 is turned off for a continuous period of time. The charge on the capacitor 106 then reaches a potential that forward biases transistor Q8 (FIG. 9), which in turn turns on transistors Q9 and Q10.

In addition, when the transistor Q7 is turned off, bias is no longer provided for the amplifier 54, and this results in the amplifier being turned off. The transmission of the prerecorded message is thereby prevented from interfering with the receipt of the control signal, and should the prerecorded message happen to include bursts at the same frequency as the control signal, it is prevented from providing a false input.

The result produced by the turning on of the transistor Q10 (FIG. 8) depends upon the position of the M disc (FIG. 2) at the time the control signal is transmitted. About midway through each transmission of the message, the switch $M_7$—$_8$ opens and the switches $M_{17}$—$_{18}$ and $M_4$—$_5$ close for periods of about 6, 5 and 4 seconds respectively. The switches $M_7$—8 and $M_{17}$—$_{18}$ respectively open and close first. The opening of the switch $M_7$—$_8$ (FIG. 9) interrupts the power path of the unlatch winding of the operate relay 0, while the closing of the switch $M_{17}$—$_{18}$ (FIG. 7) energizes the oscillator 68 (FIG. 6), a path being provided from the power source through the closed switch $V_{18}$—$_{17}$ (FIG. 7), closed contacts $SU2_1$, a diode 106, the closed switch $M_{17}$—$_{18}$, the oscillator (FIG. 6), and closed contacts $MR_4$ to ground. The energized oscillator 68 at this time generates a continuous tone, referred to as the interrogate signal, that is superimposed upon the message. Then about 1 second later, the switch $M_4$—$_5$ closes and in combination with closed contacts $R_5$ (FIG. 7) connects the subscriber relays SU to the collector of the transistor Q10 (FIG. 8).

If the control signal is transmitted at this time, the subscriber relay SU (FIG. 7) associated with the event being reported, in this case SU2, is energized inasmuch as a path is provided from the power source through the closed switch $V_{18}$—$_{17}$, the relay winding, the closed switch $M_4$—$_5$ (FIG. 6), closed contacts $R_5$ (FIG. 7), the transistor Q10 (FIG. 8), and closed contacts $MR_4$ to ground.

The energized subscriber relay SU2 (FIG. 7) opens contacts $SU2_1$ to interrupt the continuous bias path of the oscillator 68 (FIG. 6) and thereby terminates transmission of the interrogate signal. The called station is thereby informed that the subscriber relay has been operated. In addition, the contacts $SU2_2$ close to provide an alternate ground path to that provided by the transistor Q10, thus keeping the SU relay operated until $m_4$—$_5$ opens and contacts $SU2_3$ and $SU2_4$ (FIG. 7) respectively open and close. These latter contacts may be used by the subscriber to either initiate corrective action with respect to event 2 or initiate some other activity at the facility at which the reporting set is located.

If no control signal is transmitted at this time, the interrogate signal is terminated by the reopening of the switch $M_{17}$—$_{18}$ about 4 seconds after the closure of the switch $M_4$—$_5$ (FIG. 6). The switch $M_4$—$_5$ reopens about a half second later and if the control signal was transmitted, it deenergizes the subscriber relay SU2. Finally about 1 second later, the switch $M_7$—$_8$(FIG. 9) recloses to reconnect the unlatch winding of the operate relay 0 to the power source.

Thus if the control signal is transmitted by the called station at essentially the same time that the reporting set is transmitting the interrogate signal, the subscriber relay SU associated with the event being reported is briefly energized. If, on the other hand, the control signal is transmitted at any other time during the call, the calling attempts with respect to the event being reported are terminated, and the reporting set is either reset to a standby condition, or it commences to report another event that has occurred.

This result transpires because with the switch $M_7$—$_8$ (FIG. 9) closed, the turning on of the transistor Q10 (FIG. 8) by the transmission of the control signal, energizes the unlatch winding of the operated relay 0 (FIG. 9), a path being provided from the power source through the closed switch $M_7$—$_8$, closed contacts $0_2$, the unlatch winding, a diode 108 (FIG. 6), closed contacts $R_5$ (FIG. 7), the transistor Q10, and closed contacts $MR_4$ to ground. Contacts $o_6$ (FIG. 4) reopen and drop the telephone line. In addition, contacts $0_1$ (FIG. 9) reclose in the power path of the latch winding of the operate relay 0, contacts $0_2$ reopen in the power path of the unlatch winding, and contacts $0_3$ reclose in the power path of the unlatch winding of the event relay EV. (FIG. 6). Furthermore, contacts $0_4$ (FIG. 10) reopen in the ground path of the stepping relay SP, contacts $0_5$ reclose in the ground path of the unlatch windings of the call-back relay CB (FIG. 7) and call-in relay CI, and contacts $0_7$ (FIG. 10) reopen in one of the ground paths of the motor 26.

Then as the M disc (FIG. 2) completes its rotation, the switch $M_1$—$_2$ closes momentarily and unlatches the event relay EV2, a path being provided from the power source through the closed switch $M_7$—$_8$ (FIG. 9), closed contacts $0_3$, the closed switch $M_1$—$_2$, the unlatch winding of the relay (FIG. 6), closed contacts $EV2_1$, a diode 110, the closed switch $V_{40}$—$_{38}$, closed contacts $CI_4$ (FIG. 7), $HS_2$ FIG. 9 and $RP_1$ to ground. Contacts $EV2_1$ (FIG. 6) reopen in the ground path of the unlatch winding while contacts $EV2_2$ reclose and $EV2_4$ (FIG. 9) reopen in ground paths of the stepping relay SP and contacts $EV2_5$ reopen in the ground path of the latch winding of the operate relay 0.

Immediately thereafter the switch $M_{11}$—$_{15}$ (FIG. 10) closes momentarily and energizes the unlatch winding of the motor relay MR (FIG. 5) since a path is provided from the power source through closed contacts $MR_2$, the unlatch winding, closed contacts $CM_3$ (FIG. 10), and the closed switch $M_{11}$—$_{15}$ to ground. The contacts of the motor relay MR (FIG. 5) return to their normal condition and with the reclosing of the contacts $MR_3$ a path is provided from the power source through closed contacts $MR_3$, $CI_5$ (FIG. 9), the winding of the stepping relay SP, closed contacts $SP_1$, $EV2_2$ (FIG. 6), the diode 110, the closed switch $V_{40}$—$_{38}$, and closed contacts $CI_4$ (FIG. 7), $HS_2$ (FIG. 9) and $RP_1$ to ground. the stepping relay SP is repetitively energized by the opening and closing of the contacts $SP_1$ and assuming that no further events have occurred, the wiper arm is advanced along the V disc (FIG. 3) to the home position.

In moving from position 23 to position 11, the switch $V_{40}$—$_{38}$ reopens and the switch $V_{39}$—$_{38}$ closes and the energizing path of the stepping relay SP then includes closed contacts $EV1_2$ (FIG. 6), a diode 112, and the closed switch $V_{39}$—$_{38}$ instead of closed contacts $EV2_2$, the diode 110, and the switch $V_{40}$—$_{38}$. Then in moving from position 13 to the home position, the switch $V_{39}$—$_{38}$ reopens and terminates the energizing path. The motor 52 continues to run until the M disc (FIG. 2) rotates to the home position whereupon the switch $M_{11}$—$_{12}$ (FIG. 10) opens and deenergizes the motor. The reporting set is at this point reset to the standby condition.

If no resetting control signal is received, which result may occur because the called station is busy, or because the called station does not answer, or because the called station is not equipped to transmit the control signal, or because the called station does not wish to reset the reporting set, the reporting set continues to transmit the recorded message until shortly before the M disc (FIG. 2) returns to the home position. At this time, the switch $M_{20}$—$_{21}$ (FIG. 6) opens and drops the telephone line. About a second later, the switch $M_{11}$—$_{15}$ (FIG. 10) closes momentarily and unlatches the motor relay MR (FIG. 5) in the same manner as described above. The contacts $MR_3$ reclose and complete a path from the power source through closed contacts $CI_5$ (FIG. 9), the winding of the stepping relay SP, closed contacts $CB_4$ and $CI_8$, a diode 114 (FIG. 10), closed contacts $0_4$, $CM_3$, and closed switch $M_{11}$—$_{15}$ to ground. The stepping relay SP (FIG. 9) is energized just once, advancing the wiper arm along the V disc (FIG. 3) from position 21 to position 22. The only change resulting from this advance is the opening of the switch $V_6$—$_{38}$ and the closing of the switch $V_5$—$_{38}$ (FIG. 5) whereby circuitry related to the next station to be called by the reporting set is connected into the circuit of the automatic call transmitter.

Immediately thereafter the switch $M_{20}$—$_{21}$ (FIG. 6) closes to reseize the telephone line and this is followed by the closing of the switch $M_{11}$—$_{16}$ (FIG. 10) to energize the motor 26, the motor 52 being subsequently deenergized by the opening of the switch $M_{11}$—$_{12}$ when the M disc (FIG. 2) returns to the home position. The energized motor 26 operates the automatic call transmitter (FIG. 5) to call the telephone number selected for the second call of event 2 and the reporting cycle described above is repeated.

If no resetting control signal is received during the second call, the stepping relay SP (FIG. 9) is again energized once at the end of the reporting cycle to advance the wiper arm to position 23 on the V disc (FIG. 3). As a result, the reporting cycle is once again repeated, this time the call being made to the station selected for the third call of event 2.

However, in position 23, as is true in positions 43, 33, and 13, the switch $V_{24}$—$_{25}$ is closed, and if no resetting control signal is received during the third call, what occurs depends upon the position of button 2 on the event reporting key 48 (FIG. 1), button 2 being associated with event 2. If the button is in the "Indefinitely" position, whereby the contacts $ER2_1$ (FIG. 7) are open, then at the end of the reporting cycle the stepping relay SP is again energized once to advance the wiper arm to position 11 on the V disc (FIG. 3). This results in the closing of the switch $V_{39}$—$_{38}$ and assuming that no other events have occurred, a path is completed from the power source through the closed contacts $MR_3$ (FIG. 5), $CI_5$ (FIG. 9) the winding of the stepping relay SP, closed contacts $SP_1$ and $EV1_2$ (FIG. 6), the diode 112, the closed switch $V_{39}$—$_{38}$, closed contacts $CI_4$ (FIG. 7), $HS_2$ (FIG. 9), and $RP_1$ to ground. The stepping relay SP is then repetitively energized to step the wiper arm to the home position of the V disc (FIG. 3).

In the home position, the switch $V_{31}$—$_{37}$ closes, and the stepping relay SP is then repetitively energized by the path extending from the power source through closed contacts $MR_3$ (FIG. 5) and $CI_5$ (FIG. 9), the winding of the stepping relay SP, closed contacts $SP_1$ and $EV2_4$, the closed switch $V_{31}$—$_{37}$, closed contacts $LU_3$, $N_2$, $CL_6$, $CI_4$ (FIG. 7), $HS_2$ (FIG. 9) and $RP_1$ to ground. This path remains until the stepping relay SP advances the wiper arm to position 21, and in this position the calling of the three stations associated with event 2 is reinitiated. Thus if no resetting control signal is received, the reporting set will continue to call the three stations indefinitely.

If on the other hand, button 2 of the event reporting key 48 (FIG. 1) is in the "3 Times" position, whereby the contacts $ER2_1$ (FIG. 7) are closed, then near the end of the third reporting cycle when the switch $M_4$—$_6$ (FIG. 2) closes momentarily, a path is provided from the power source through closed switch $M_7$—$_8$ (FIG. 9), closed contacts $O_2$, the unlatch winding of the operate relay O, the diode 108 (FIG. 6), the closed switches $M_4$—$_6$ (FIG. 7), and $V_{24}$—$_{25}$, closed contacts $ER2_1$, a diode 115, the closed switch $V_{40}$—$_{38}$ (FIG. 6), closed contacts $CI_4$ (FIG. 7), $HS_2$ (FIG. 9) and $RP_1$ to ground. The operate relay O is unlatched and the reporting set is thereafter reset to a standby condition in the same manner as when a resetting control signal is received. Thus with the buttons of the event reporting key 48 (FIG. 1) in the "3 Times" position, if no resetting control signal is received, the reporting set resets to the standby condition after calling each of the three stations once.

So far it has been assumed that only one of the four monitored events has occurred. If, however, several events occur within short order of one another, the sequence of operation of the reporting set is affected by the position of the button of the priority key 50 (FIG. 1). If the button is in the event 1 position, whereby the contacts $PR_1$ (FIG. 9), $PR_2$, and $PR_3$ are closed and contacts $PR_4$, $PR_5$, and $PR_6$ are open, then event 1 has the highest priority, event 2 has the next to highest priority, and so on.

What this means is illustrated by assuming that events 1 and 2 occur at approximately the same time. Both the event relays EV1 (FIG. 6) and EV2 are latched, resulting in the opening of contacts $EV1_2$ and $EV2_2$ and the closing of contacts $EV1_4$ (FIG. 9) and $EV2_4$. Consequently, parallel energizing paths for the stepping relay SP are respectively provided through the switches $V_{31}$—$_{37}$ and $V_{30}$—$_{37}$. The wiper arm of the V disc (FIG. 3) is advanced out of the home position and in positions 41 through 43 an energizing path is also provided through the switch $V_{22}$—$_{38}$ (FIG. 6) while in positions 31 through 33 an energizing path is also provided through the switch $V_{21}$—$_{38}$. However, the path through the switch $V_{30}$—$_{37}$remains closed until the stepping relay SP advances the wiper arm to position 11 and therefore event 1 is reported first.

Furthermore, as can be deduced from the previous description of the operation of the reporting set when only a single event occurs, if button 1 of the event reporting key 48 (FIG. 1) is in the "Indefinitely" position, then event 2 is not reported until a resetting control signal is received from one of the stations to which event 1 is being reported. Whereas if the button is in the "3 Times" position, the reporting of event 2 commences upon the receiving of the resetting control signal or the completion of the three calls.

Now let us assume that event 1 occurs, whereby the event relay EV1 (FIG. 6) is latched, while event 2 is being reported. At the end of the calling cycle when the motor relay MR (FIG. 5) is unlatched, the stepping relay SP (FIG. 9) is again energized through closed contacts $EV1_4$ and the closed switch $V_{30}$—$_{37}$ to advance the wiper arm to position 11. Thus the reporting of any event of lesser priority is terminated at the end of the call in progress to initiate the reporting of the event of higher priority.

When, on the other hand, the button of the priority key 50 (FIG. 1) is in the "Equal" position, whereby contacts $PR_1$ (FIG. 9), $PR_2$, and $PR_3$ are open and contacts $PR_4$, PRd 5 and $PR_6$ are closed, the events have essentially equal priority with respect to one another, but are reported in the sequence 4, 3, 2, 1.

Thus, taking the same fact situation as above, if events 1 and 2 occur at approximately the same time, the event relays EV1 (FIG. 6) and EV2 are again latched, opening the contacts $EV1_2$ and $EV2_2$ and closing the contacts $EV1_4$ (FIG. 9) and $EV2_4$. In the home position of the wiper arm (FIG. 3), an energizing path for the stepping relay SP is only provided through the switch $V_{23}$—$_{27}$ (FIG. 9). Then in positions 41 through 43, an energizing path is only provided through the switch $V_{22}$—$_{38}$ (FIG. 6), and in positions 31 through 33 an energizing path is only provided through the switch $V_{21}$—$_{38}$. Consequently, the wiper arm is advanced to position 21, and event 2 is reported first.

Furthermore, even if button 2 of the event reporting key 48 (FIG. 1) is in the "Indefinitely" position, the reporting of event 1 commences upon the receiving of the resetting control signal or the completion of the calling of the three stations associated with event 2. Although, with button 2 in this position, if no resetting control signal is received during the reporting of event 2, the event is again reported after the three stations associated with event 1 have been called or the resetting control signal is received from one of these stations.

Likewise, if event 1 occurs while event 2 is being reported, event 1 is reported after the three stations associated with event 2 have been called or the resetting control signal has been received. Thus, with the buttons of the event reporting key in the "Indefinitely" position and the button of the priority key 50 in the "Equal" position, the reporting set alternately calls the three stations associated with each event until resetting control signals are received.

Query Mode

In the query mode of operation, the reporting set is called to check on its operation, to determine whether an alarm condition exists with respect to any of the events, and/or to operate the subscriber relays SU (FIG. 7). With the reporting set in the standby condition, the incoming call causes ringing voltage to be applied to a ringer 116 (FIG. 4), and the clapper on the energized ringer intermittently closes the switch RG (FIG. 7) in the ringing detector circuit 58. The closure of the switch RG charges capacitors 118 and 120, and after about four rings the charge on the capacitor 120 reverse biases a zener diode 122, turning on transistors Q11, Q12 and Q13. A path is then provided from the power source through the winding of the ringing relay R, the transistor Q13, a diode 124, and the closed switch $M_{11}$—$_{16}$ (FIG. 10) to ground.

The ringing relay R (FIG. 7) is energized, and contacts $R_1$ close and in combination with resistor 125 provide a path in parallel with the transistor Q13 and diode 124 whereby the ringing relay R remains energized after the transistor Q13 turns off. The energized relay also opens contact $R_2$ in the ground path of the latch winding of the call-back relay CB and closes contacts $R_3$ in the bias path of the oscillator 68 (FIG. 6). In addition, contacts $R_4$ (FIG. 7) close to connect the latch winding of the call-in relay CI to the control signal detector circuit 60 (FIG. 9) and contacts $R_5$ (FIG. 7) open to disconnect the subscriber relays SU and unlatch winding of the operate relay 0 (FIG. 9) from the control signal detector circuit. Finally, contacts $R_6$ (FIG. 6) close in a ground path of the unlatch winding of the operate relay 0, contacts $R_7$ (FIG. 10) close in a ground path of the motor relay MR, and contacts $R_8$ (FIG. 9) close in a ground path of the latch winding of the operate relay 0.

The latch winding of the operate relay 0 is energized, a path being provided from the power source through closed contacts $MR_3$ (FIG. 5), $CL_5$ (FIG. 9), $0_1$, the latch winding, and closed contacts $R_8$ to ground, and contacts $0_6$ (FIG. 4) close to seize the telephone line and terminate ringing. In addition, contacts $0_7$ (FIG. 10) close and energize the latch winding of the motor relay MR (FIG. 5), the path extending from the power source through closed contacts $MR_1$, the latch winding, closed contacts $R_7$ (FIG. 10) and $0_7$, the diode 82, and the closed switch $M_{11}$—$_{16}$ to ground. The contacts $0_7$ also complete an energized path for the motor 26, but the motor relay MR operates so quickly that contacts $MR_5$ open before the motor has a chance to start.

The unlatched motor relay Mr closes contacts $MR_4$, connecting the amplifier 54 (FIG. 4), the oscillator 68 (FIG. 6), the control signal detector circuit 60 (FIG. 8), and the motor 52 (FIG. 10) to ground. The motor 52 is energized and it commences to drive the M disc (FIG. 2) and the continuous loop of tape. The oscillator 68 (FIG. 6) is also energized, bias being provided through closed contacts $CI_3$ (FIG. 7) and $R_3$, and the oscillator transmits a continuous interrogate signal out on the telephone line.

If the calling station does not transmit the control signal in response to the interrogate signal, the unlatch winding of the operate relay 0 is energized by the closing of the switch $M_3$—$_4$ (FIG. 2) about 5 seconds after the interrogate signal is initiated, a path extending from the power source through the closed switch $M_7$—$_8$ (FIG. 9), closed contacts $0_2$, the unlatch winding, the diode 108 (FIG. 6), the closed switch $M_3$—$_4$, closed contacts $R_6$, $CI_4$ (FIG. 7), $HS_2$ (FIG. 9), and $RP_1$ to ground. The contacts $0_6$ (FIG. 4) reopen and drop the telephone line, and immediately thereafter the switch $M_{11}$—$_{16}$ (FIG. 10) opens and deenergizes the ringing relay R (FIG. 7). The motor 52 (FIG. 10) continues to run and shortly before the M disc returns to the home position, the switch $M_{11}$—$_{15}$ closes and energizes the unlatch winding of the motor relay MR (FIG. 5). The switch $M_{11}$—$_{12}$ (FIG. 10) then opens and deenergizes the motor 52 as the M disc reaches the home position, the reporting set being thereby reset to the standby condition.

If, on the other hand, the calling station transmits the control signal in response to the interrogate signal, transistor Q10 (FIG. 9) of the control signal detector circuit 60 is turned on and the latch winding of the call-in relay C1 (FIG. 7) is energized, a path being provided from the power source through closed contacts $CI_1$, the latch winding, closed contacts $R_4$, transistor Q10 (FIG. 9), and closed contacts $MR_4$ (FIG. 8) to ground. Contacts $CI_1$ open and terminate the energization of the latch winding after latching has taken place. Contacts $CI_2$ close in the power path of the latch winding of the call-back relay CB and in the power path of the unlatch winding of the call-in relay CI, while the oscillator 68 (FIG. 6) is deenergized and the interrogate signal terminated by the opening of contacts $CI_3$ (FIG. 7). Contacts $CI_4$ open in ground paths of the stepping relay SP (FIG. 9) and the unlatch winding of the operate relay 0, and thus the operate relay is not unlatched when the switch $M_3$—$_4$ (FIG. 6) closes seconds later. Contacts $CI_5$ (FIG. 9) open in a potential power path of the calling relay C (FIG. 5), and contacts $CI_6$ (FIG. 9) close in a power path of the stepping relay SP. Finally, contacts $CI_7$ (FIG. 10) close and contacts $CI_8$ open in ground paths of the stepping relay SP (FIG. 9).

Immediately thereafter the switch $M_{11}$—$_{16}$ (FIG. 2) opens and the switch $M_{10}$—$_{11}$ closes and opens. The opening of the switch $M_{11}$—$_{16}$ (FIG. 10) deenergizes the ringing relay R (FIG. 7) while the closing and opening of the switch $M_{10}$—$_{11}$ (FIG. 10) briefly energizes the stepping relay SP (FIG. 9), a path being provided from the power source through the closes switch $M_7$—$_8$, closed contacts $CI_6$, the relay winding, closed contacts $CB_4$ (FIG. 10) and $CI_7$, and closed switch $M_{10}$—$_{11}$ to ground. The stepping relay SP advances the wiper arm to position 41 on the V disc (FIG. 3) and the switches $V_{36}$—$_{28}$, $V_{35}$-—$_{34}$, and $V_{20}$—$_{17}$ close.

The switch $V_{36}$—$_{28}$ (FIG. 5) connects the record-play winding RPW 4 to the input of the amplifier 54 (FIG. 4) and the message associated with event 4 is transmitted out on the telephone line. The switch $V_{35}$—$_{34}$ (FIG. 6) closes so that if the alarm condition with respect to event 4 exists at the time the message is being transmitted, the intermittent alarm signal is superimposed upon it. And the switch $V_{20}$—$_{17}$ (FIG. 7) closes so that the subscriber relay SU4 may be energized by the calling station sending the control signal in response to the interrogate signal superimposed upon the message.

If the control signal is sent when the interrogate signal is not being transmitted, the reporting set drops the telephone line and resets to a standby condition in the same manner as in the report mode. The unlatching of the operate relay 0 (FIG. 9) closes contacts $0_5$ (FIG. 10) and just before the M disc returns to the home position, the switch $M_{11}$—$_{15}$ closes and unlatches the call-in relay CI. However, if event 4 has occurred whereby the event relay EV4 (FIG. 6) is latched, the sending of the resetting control signal does not unlatch the relay because of the contacts $CI_4$ (FIG. 7) being open. Consequently, when events occur during the query mode, the reporting set reverts to the report mode upon being reset, and commences to report the occurrences of these events in the manner previously described.

If the resetting control signal is not sent, then at the end of the event 4 message, the switch $M_{10}$—$_{11}$ (FIG. 10) closes and opens three times in succession to repetitively energize the stepping relay SP (FIG. 9) and advance the wiper arm (FIG. 3) to position 31 on the V disc. Thus the reporting set now transmits the message associated with event 3 and the alarm signal is superimposed upon the message if the event 3 alarm condition exists. In addition, subscriber relay SU3 (FIG. 7) may be energized if the control signal is transmitted in response to the interrogate signal.

At the end of the event 3 message, the stepping relay is again energized three times in succession and the wiper arm (FIG. 3) is advanced to position 21 to initiate the transmission of the event 2 message. Similarly at the end of the event 2 message the wiper arm is advanced to position 11 to initiate the transmission of the event 1 message, and then at the end of the event 1 message the wiper arm is advanced to the home position. Consequently if no resetting control signal is sent, the calling station hears all four of the event messages, ascertains whether any of the four alarm conditions exist, and has the opportunity to operate all four of the subscriber relays SU (FIG. 7).

At about the same time that the wiper arm is advanced to the home position, the switch $M_{20}$—$_{21}$ (FIG. 4) opens and drops the telephone line, and the switch $M_{11}$—$_{15}$ (FIG. 10) briefly closes and unlatches the motor relay MR (FIG. 5). The switch $M_{20}$—$_{21}$ (FIG. 4) then recloses to reseize the telephone line and the switch $M_{11}$—$_{16}$ (FIG. 10) recloses and energizes the latch winding of the call-back relay CB (FIG. 7), a path being provided from the power source through closed contacts $CI_2$ and $CB_1$, the latch winding, a diode 126, closed contacts $R_2$, and the closed switch $M_{11}$—$_{16}$ (FIG. 10) to ground. This is followed by the opening of the switch $M_{11}$—$_{12}$, whereby the motor 52 is deenergized, as the M disc returns to the home position.

The latched call-back relay $\overline{CB}$ (FIG. 7) closes contacts $CB_1$ to terminate current flow through the latch winding and closes $CB_2$ in a bias path of the oscillator 68 (FIG. 6). In addition, contacts $CB_3$ (FIG. 9) close in the power path of the unlatch winding of the operate relay 0 and contacts $CB_4$ (FIG. 10) open in the ground path of the stepping relay SP (FIG. 9) through the switch $M_{10}$—$_{11}$ (FIG. 10), thereby preventing the stepping relay SP from moving the wiper arm out of the home position when the M disc is subsequently rotated. Finally, contacts $CB_5$ (FIG. 5) close to connect the "F" telephone number into the circuit of the automatic call transmitter 25. The closed contacts $CB_5$ are also in a ground path of the unlatch winding of the operate relay 0 (FIG. 9).

The motor 26 (FIG. 10) is energized upon the closure of the switch $M_{11}$—$_{16}$ and thus the "F" telephone number is dialed by the automatic call transmitter 25 (FIG. 5), and upon completion of dialing, the latch winding of the motor relay MR is energized through the matrix of the call transmitter. The motor 52 (FIG. 10), control signal detector circuit 60 (FIG. 8), and oscillator 68 (FIG. 6) are thereupon energized by the closure of the contacts $M_4$, power for the oscillator being provided through closed contacts $CB_2$ (FIG. 7) and a diode 128. Inasmuch as the wiper arm remains in the home position of the V disc (FIG. 3), none of the record-play windings RPW (FIG. 5) are connected to the amplifier 54 (FIG. 4), and therefore only a continuous tone is transmitted out on the telephone line.

If the called station returns the control signal, the turning on of the transistor Q10 (FIG. 9) of the control signal detector circuit 60 energizes the unlatch winding of the operate relay 0, a path being provided from the power source through closed contacts $CB_3$ and $0_2$, the unlatch winding, the diode 108 (FIG. 6), the transistor Q10 (FIG. 7) and closed contacts $MR_4$ (FIG. 8) to ground. The reporting set then resets in the same manner as when a resetting control signal is transmitted in the report mode except that the unlatch windings of both the call-back relay CB (FIG. 7) and the call-in relay CI are energized when the switch $M_{11}$—$_{15}$ (FIG. 10) briefly closes shortly before the M disc returns to the home position.

If the called station does not return the control signal, the unlatch winding of the operate relay 0 (FIG. 9) is energized by the closure of the switch $M_4$—$_6$ (FIG. 2), a path extending from the power source through closed contacts $CB_3$ (FIG. 9) and $0_2$, the unlatch winding, the diode 108 (FIG. 6), the closed switch $M_4$—$_6$ (FIG. 7), a diode 130 (FIG. 5) and closed contacts $CB_5$ to ground. The reporting set then resets in the manner previously described. Thus it is seen that this call-back feature essentially serves as a means for testing the operation of the automatic call transmitter.

Although a specific embodiment of the invention has been shown and described, it will be understood that it is but illustrative and that various modifications may be made without departing from the scope and spirit of this invention as defined in the appended claims.

We claim:

1. A telephone set for reporting when one or more of a plurality of preselected conditions occur, the telephone reporting set comprising:
   an automatic call transmitter;
   means for selecting with respect to each condition an individual station to be called by the automatic call transmitter when that condition occurs;
   means for initiating the operation of the automatic call transmitter responsive to the occurrence of one of the preselected conditions;
   means for informing the called station that a preselected condition has occurred; and
   means for selecting the priority the conditions are to be given with respect to one another in reporting the occurrence of the conditions when more than one condition of lower priority being reported subsequent to the reporting of the occurrence of a condition of higher priority.

2. A telephone set for reporting when one or more of a plurality of preselected conditions occur, the telephone reporting set comprising:
   an automatic call transmitter;
   means for selecting with respect to each condition a particular group of stations to be called by the automatic call transmitter when that condition occurs;
   means for initiating the operation of the automatic call transmitter responsive to the occurrence of one or more of the preselected conditions;
   means for informing each called station that a preselected condition has occurred; and
   means for selecting the priority the conditions are to be given with respect to one another in reporting the occurrence of the conditions when more than one condition occurs at about the same time, the occurrence of a condition of lower priority being reported subsequent to the reporting of the occurrence of a condition of higher priority.

3. A telephone reporting set as in claim 2 wherein the station selecting means includes switches for selecting the individual digits of a plurality of telephone numbers and for selecting for each condition certain ones of the telephone numbers to be called and the sequence in which they are to be called when that condition occurs.

4. A telephone reporting set as in claim 1 wherein the priority selecting means includes a switch for selecting the order in which the occurrence of the conditions is reported.

5. A telephone reporting set as in claim 2 wherein when a condition occurs while another condition is being reported the priority selecting means determines whether other stations associated with the condition being reported may be called before the reporting of the subsequent condition commences.

6. A telephone reporting set as in claim 1 wherein when the occurrence of a condition is being reported and a condition of higher priority occurs, the call in progress is always completed before the reporting of the occurrence of the condition of higher priority is initiated.

7. A telephone reporting set as in claim 2 wherein when the occurrence of a condition is being reported and a condition of higher priority occurs, the priority selecting means determines whether other stations associated with the condition being reported may be called before the occurrence of the condition of higher priority is reported or whether the reporting of the occurrence of the condition of higher priority is always initiated upon the completion of the call in progress.

8. A telephone set for reporting when one or more of a plurality of preselected conditions occur, the telephone reporting set comprising:
   an automatic call transmitter;
   means for selecting with respect to each condition a particular group of stations to be called by the automatic call transmitter when that condition occurs;
   means for initiating the operation of the automatic call transmitter responsive to the occurrence of one or more of the preselected conditions;
   means for informing each called station that a preselected condition has occurred;
   means for transmitting an interrogate signal to each called station;
   means for detecting a control signal transmitted by the called station, the detecting means being placed in a particular state responsive to receiving the control signal at any time during the call; and
   means responsive to the detecting means being placed in the particular state concurrent with the transmission of the interrogate signal for operating a relay associated with the particular condition being reported.

9. A telephone reporting set as in claim 8 further including means responsive to the detecting means being placed in the particular state when the interrogate signal is not being transmitted for causing the reporting set to discontinue the reporting of the condition then being reported and reset to allow for the reporting of other conditions.

10. A telephone reporting set as in claim 2 further including means for detecting a resetting control signal transmitted by the called station, the reporting set discontinuing the reporting of the condition then being reported and resetting to allow for the reporting of other conditions responsive to the detecting means receiving the resetting control signal.

11. A telephone reporting set as in claim 10 further including means for causing the reporting set to continue to report the occurrence of a condition by sequentially calling each of the stations associated with the condition until a resetting control signal is received.

12. A telephone reporting set as in claim 10 wherein the priority selecting means includes means for causing the occurrence of a condition of higher priority to continue to be reported until a resetting control signal is received.

13. A telephone reporting set as in claim 10 wherein the priority selecting means includes means for causing the occurrence of a condition of higher priority to be reported until a particular number of successive calls are completed if no resetting control signal is received before the completion of the calls.

14. A telephone reporting set as in claim 2 wherein when the occurrence of a condition is being reported and a condition of higher priority occurs, the priority selecting means determines whether the reporting of the occurrence of the condition of higher priority is always initiated upon the completion of the call in progress.

15. A telephone reporting set as in claim 10 wherein the priority selecting means includes means for causing the occurrence of a condition to be reported once to each station associated with the condition if no resetting control signal is received before the completion of the calls.